(12) United States Patent
Russell

(10) Patent No.: US 7,053,377 B2
(45) Date of Patent: May 30, 2006

(54) PORTABLE SOLID-STATE REMOTE DOSIMETER

(75) Inventor: Kevin J. Russell, Melbourne, FL (US)

(73) Assignee: Capintec, Inc., Ramsey, NJ (US)

( * ) Notice: Subject to any disclaimer, the term of this patent is extended or adjusted under 35 U.S.C. 154(b) by 386 days.

(21) Appl. No.: 10/411,439

(22) Filed: Apr. 10, 2003

(65) Prior Publication Data

US 2004/0200967 A1    Oct. 14, 2004

(51) Int. Cl.
*G01T 1/24*    (2006.01)
(52) U.S. Cl. ............................ 250/370.01; 250/370.04; 250/370.07
(58) Field of Classification Search ............ 250/370.01, 250/370.04, 370.07
See application file for complete search history.

(56) References Cited

U.S. PATENT DOCUMENTS

| 5,256,879 | A  | * | 10/1993 | McNulty et al. | ........ | 250/370.06 |
| 5,493,600 | A  | * | 2/1996  | Jacobson | .................... | 378/207 |
| 6,885,007 | B1 | * | 4/2005  | Donaghue et al. | .......... | 250/394 |
| 2005/0056791 | A1 | * | 3/2005  | Donaghue et al. | .......... | 250/394 |

* cited by examiner

*Primary Examiner*—Constantine Hannaher
(74) *Attorney, Agent, or Firm*—Martin Fleit; Paul D. Bianco; Fleit Kain Gibbons Gutman Bongini & Bianco, P.L.

(57) ABSTRACT

A dosimetry system having a solid-state dosimeter with one or more solid-state detectors for detecting radiation and an electrometer module with a circuit adapted to receive electrical impulses from the solid-state detectors, convert the impulses into a count and provide such count to a computer.

19 Claims, 26 Drawing Sheets

| Field name | Data type | Description |
|---|---|---|
| PatientID | String | Patient name or number |
| TreatmentID | String | Name or number of this treatment |
| ExposureField | String | The location that is being irradiated |
| Time | String | Time of the exposure |
| SerialNumber | String | Serial number of the 2Basic unit recording the data |
| Energy | String | Energy type: electrons or photons |
| SDD | Integer | Distance from source to target |
| EnergyDescriptor1 | String | Energy description string 1 contains wedge or Bolus |
| EnergyDescriptor2 | String | Energy description string 2 contains field or cone size |
| Physician | String | Name of physician |
| Physics | String | Name of physicist |
| Preparation | String | Name of person performing exposure |
| Comment | String | Free form comment about exposure |
| Units | String | Unit of measure: rads or centi-grays |
| TotalDose | Integer | Dose setting as entered on accelerator |
| D1Expected | Float | Expected reading for detector 1 |
| D2Expected | Float | Expected reading for detector 2 |
| D1UserCorrection | Float | Amount of user applied correction for detector 1 |
| D2UserCorrection | Float | Amount of user applied correction for detector 2 |
| D1MeasuredDose | Float | Measured dose reading for detector 1 |
| D2MeasuredDose | Float | Measured dose reading for detector 2 |

FIG.18

| Field | Type | Description |
| --- | --- | --- |
| Sequence# | Integer | Sequence# from remote |
| Mode | Integer | 0 = MODE_IDLE, 1 = MODE_DRIFT_TEST, 2 = MODE_END_DRIFT_TEST, 3 = MODE_FACTORY_CALIBRATION, 4 = MODE_CALIBRATION, 5 = MODE_RUNNING |
| SampleCount | Integer | Samples after drift test |
| D1Offset | Integer | Detector 1 offset from drift test |
| D1Drift | Float | Detector 1 drift per sample from drift test |
| D1Multiplier | Float | Detector 1 total correction |
| D1Counts | Integer | Detector 1 counts from remote |
| D1CorrCounts | Integer | Detector 1 counts with offset subtracted |
| Det1Accumulator | Integer | Detector 1 total accumulated counts |
| D1Reset | Integer | Set when Detector 1 integrator reset |
| D1TotalCounts | Integer | Detector 1 total accumulated counts with drift correction |
| D1Dose | Float | Detector 1 Accumulated dose: D1TotalCounts * D1Multiplier |
| D1DeltaCounts | Integer | Change in D1TotalCounts from previous sample |
| D1Rate | Float | D1DeltaCounts converted to rad units per minute |
| D2Offset | Integer | Detector 2 offset from drift test |
| D2Drift | Float | Detector 2 drift per sample from drift test |
| D2Multiplier | Float | Detector 2 total correction |
| D2Counts | Int | Detector 2 counts from remote |
| D2CorrCounts | Integer | Detector 2 counts with offset subtracted |
| Det2Accumulator | Integer | Detector 2 total accumulated counts |
| D2Reset | Integer | Set when Detector 2 integrator reset |
| D2TotalCounts | Integer | Detector 2 total accumulated counts with drift correction |
| D2Dose | Float | Detector 2 Accumulated dose: D1TotalCounts * D1Multiplier |
| D2DeltaCounts | Integer | Change in D2TotalCounts from previous sample |
| D2Rate | Float | D2DeltaCounts converted to rad units per minute |

FIG.19

| Field | Type | Description |
|---|---|---|
| SmplCounts1 | Integer | Change in D1TotalCounts from previous sample |
| D1Average | Integer | Average of Det 1 buffer which is used to detect rad on and rid off |
| Det1Dose | Float | Detector 1 Accumulated dose: D1TotalCounts * D1 Multiplier |
| Det1PreRadLevel | Float | Det 1 dose before radiation start |
| AccumDose1 | Float | Det 1 dose accumulated prior to continue keypress |
| Dose1 | Float | Det 1 dose accumulated for this measurement and previous if continued |
| Det1Rate | Float | D1DeltaCounts converted to rad units per minute |
| SmplCounts2 | Integer | Change in D2TotalCounts from previous sample |
| D2Average | Integer | Average of Det 2 buffer which is used to detect rad on and rad off |
| Det2Dose | Float | Detector 2 Accumulated dose: D1TotalCounts * D1Multipltier |
| Det2PreRadLevel | Float | Det 2 dose before radiation start |
| AccumDose2 | Float | Det 1 dose accumulated prior to continue keypress |
| Dose2 | Float | Det 1 dose accumulated for this measurement and previous if continued |
| Det2Rate | Float | D2DeltaCounts converted to rad units per minute |
| D1Cal | Float | Detector 1 configuration multiplier |
| D1Comp | Float | Detector 1 configuration adjustment multiplier |
| D1UserCorr | Float | Detector 1 user correction multiplier |
| D2Cal | Float | Detector 2 configuration multiplier |
| D2Comp | Float | Detector 2 configuration adjustment multiplier |
| D2UserCorr | Float | Detector 2 user correction multiplier |

FIG. 20

| Field name | Key | Data type | Description |
|---|---|---|---|
| PatientID | Y | String of length 40 | Patient name or number |
| TreatmentID | Y | String of length 20 | Name or number of this treatment |
| ExposureField | Y | String of length 20 | The location of that is being irradiated |
| Time | Y | TDateTime | Time of the exposure |
| SerialNumber | N | String of length 10 | Serial number of the 2Basic unit recording the data |
| Energy | N | String of length 10 | Energy type: electrons or photons |
| SDD | N | SmallInt | Distance from source to target |
| EnergyDescriptor1 | N | String of length 10 | Energy description string 1 contains wedge or Bolus |
| EnergyDescriptor2 | N | String of length 10 | Energy description string 2 contains field or cone size |
| Physician | N | String of length 20 | Name of physician |
| Physics | N | String of length 20 | Name of physicist |
| Preparation | N | String of length 20 | Name of person performing exposure |
| Comment | N | String of length 255 | Free form comment about exposure |
| Units | N | String of length 10 | Unit of measure: rads or centi-grays |
| TotalDose | N | SmallInt | Dose setting as entered on accelerator |
| D1Expected | N | Float | Expected reading for detector 1 |
| D2Expected | N | Float | Expected reading for detector 2 |
| D1UserCorrection | N | Float | Amount of user applied correction for detector 1 |
| D2UserCorrection | N | Float | Amount of user applied correction for detector 2 |
| D1MeasuredDose | N | Float | Measured dose reading for detector 1 |
| D2MeasuredDose | N | Float | Measured dose reading for detector 2 |
| D1MeasuredCounts | N | Int | Measured counts for detector 1 |
| D2MeasuredCounts | N | Int | Measured counts for detector 2 |
| D1Calibration | N | Float | Detector 1 configuration correction used |

FIG.21A

| D2Calibration | N | Float | Detector 2 configuration correction used |
| --- | --- | --- | --- |
| D1CalCorrection | N | Float | Detector 1 configuration adjustment used |
| D2CalCorrection | N | Float | Detector 2 configuration adjustment used |

FIG.21B

| Field name | Key | Data a type | Description |
| --- | --- | --- | --- |
| SerialNumber | Y | String of length 10 | Serial number of the 2Basic Remote |
| Accelerator | Y | String of length 20 | Accelerator identification |
| Energy | Y | String of length 10 | Energy type: electrons or photons |
| Date | N | TDateTime | Time of configuration |
| Units | N | String of length 10 | Unit of measure: rads or centi-grays |
| Distance | N | SmallInt | Nominal distance: Set to 100** |
| DeliveredRad | N | SmallInt | Accelerator radiation setting |
| D1Valid | N | Boolean | Indicates whether detector 1 configuration valid |
| D2Valid | N | Boolean | Indicates whether detector 2 configuration valid |
| D1Calibration | N | Float | Detector 1 configuration correction for electrons |
| D1MeasuredAvg | N | Float | Detector 1 average counts for last group of exposures |
| D1StdDev | N | Float | Detector 1 counts standard deviation for last group of exposures |
| D2Calibration | N | Float | Detector 2 configuration correction for electrons |
| D2MeasuredAvg | N | Float | Detector 2 average counts for last group of exposures |
| D2StdDev | N | Float | Detector 2 counts standard deviation for last group of exposures |
| D1CalCorrection | N | Float | Detector 1 configuration adjustment applied |
| D2CalCorrection | N | Float | Detector 2 configuration adjustment applied |
| ExpectedRadShort | N | Float | Expected radiation at the short (90 cm) distance |

FIG.22A

| | | | |
|---|---|---|---|
| ExpectedRadMedium | N | Float | Expected radiation at the medium (100 cm) distance |
| ExpectedRadLong | N | Float | Expected radiation at the long (100 cm) distance |
| D1AvgCountsShort | N | Float | Detector 1 average counts for short distance exposures |
| D1AvgCountsMedium | N | Float | Detector 1 average counts for medium distance exposures |
| D1AvgCountsLong | N | Float | Detector 1 average counts for long distance exposures |
| D2AvgCountsShort | N | Float | Detector 2 average counts for short distance exposures |
| D2AvgCountsMedium | N | Float | Detector 2 average counts for medium distance exposures |
| D2AvgCountsLong | N | Float | Detector 2 average counts for long distance exposures |
| D1StdDevShort | N | Float | Detector 1 counts standard deviation for short distance exposures |
| D1StdDevMedium | N | Float | Detector 1 counts standard deviation for medium distance exposures |
| D1StdDevLong | N | Float | Detector 1 counts standard deviation for long distance exposures |
| D2StdDevShort | N | Float | Detector 2 counts standard deviation for short distance exposures |
| D2StdDevMedium | N | Float | Detector 2 counts standard deviation for medium distance exposures |
| D2StdDevLong | N | Float | Detector 2 counts standard deviation for long distance exposures |
| D1CorrShort | N | Float | Detector 1 configuration correction for short distance exposures, NOT USED |
| D1CorrMedium | N | Float | Detector 1 configuration correction for medium distance exposures, NOT USED |

FIG.22B

| | | | |
|---|---|---|---|
| D1CorrLong | N | Float | Detector 1 configuration correction for long distance exposures, NOT USED |
| D2CorrShort | N | Float | Detector 2 configuration correction for short distance exposures, NOT USED |
| D2CorrMedium | N | Float | Detector 2 configuration correction for medium distance exposures, NOT USED |
| D2CorrLong | N | Float | Detector 2 configuration correction for long distance exposures, NOT USED |
| D1Slope1 | N | Float | Detector 1: line 1 slope configuration correction for photons |
| D1Offset1 | N | Float | Detector 1: line 1 offset configuration correction for photons |
| D2Slope1 | N | Float | Detector 2: line 1 slope configuration correction for photons |
| D2Offset1 | N | Float | Detector 2: line 1 offset configuration correction for photons |
| D1Slope2 | N | Float | Detector 1: line 2 slope configuration correction for photons |
| D1Offset2 | N | Float | Detector 1: line 2 offset configuration correction for photons |
| D2Slope2 | N | Float | Detector 2: line 2 slope configuration correction for photons |
| D2Offset2 | N | Float | Detector 2: line 2 offset configuration correction for photons |

FIG.22C

PORTABLE SOLID-STATE REMOTE DOSIMETER

FIELD OF THE INVENTION

This invention relates to solid-state dosimeters in general, diode dosimeters in particular, more particularly to a remote dosimeter that transmits its measurements to a processing device, such as a computer.

BACKGROUND OF THE INVENTION

Radiation therapy is a common curative procedure to treat cancer. The goal of the radiotherapy process is to expose the tumor to a sufficient dose of radiation so as to eradicate all cancer cells. The radiation dose is often close to the tolerance level of the normal body tissues. Therefore, it is necessary to determine the dosage levels in different parts of the irradiated body with high accuracy. Intensity Modulated Radiation Therapy (IMRT) is a complex radiation delivery system, with there being many steps between the calibration of the beam of the therapy radiation unit to the determination of the radiation dose at the desired point of interest in the patient. IMRT typically uses a linear accelerator ("LINAC") as the source of the radiation beam used to treat the tumor. The linear accelerator typically has a radiation beam source that is rotated about the patient and directs the radiation beam toward the tumor to be treated.

In radiation therapy, it is important to ensure that the absolute dose delivered is consistent with the planned dose, and that the critical spatial resolution of that dose is consistent with the planned dose distribution. The verification of IMRT patient treatment includes the use of dosimeters to measure the radiation dosage during the treatment (generally referred to as "in-vivo dosimetry").

With respect to the design of such dosimeters, it is known in the art to use diodes to measure radiation doses to patients and to output radiation measurements to a computer for further processing. One such device, sold under the trademark IVD by Sun Nuclear Corporation, has a detection pod which requires the user to select from a plurality of different possible radiation detectors (at least four different sets), with the selected set being removably coupled to the detection pod. The radiation detectors selected depends upon the particular patient tests to be undertaken, with each different radiation detector selected requiring recalibration. In addition to the added complexity caused by having calibrate different detectors each time they are changed, the need for the user to have available so many different types of detectors is quite expensive. Moreover, the selection process between so many possible radiation detectors may lead to errors being made by the user not selecting the right radiation detector.

Additionally, the Sun Nuclear unit provides the option to send processed data from the detection pod to a computer or control module. However, in this Sun Nuclear product, the data is mostly processed within the detection pod and the computer or control unit, depending upon the option selected, is therefore little more than an alternative display device. Hence, in the Sun Nuclear unit the greater processing power of the PC is not used to convert the raw count to a radiation measurement.

What is needed is a portable dosimeter that can use the same radiation detectors without the need for continuous recalculations for different radiation detectors. Additionally, it is desirable to maximize processing of data in the computer.

SUMMARY OF THE INVENTION

The present invention is directed toward a dosimeter for verification the amount of radiation received by a patient undergoing radiation therapy, comprising at least one dedicated, solid-state radiation detector for generating a plurality of electrical impulse signals in response to detecting the radiation; an electrometer module, in response to receiving the electrical impulse signals from said radiation detector, for converting the electrical impulse signals into a numerical count and outputting the count; and an electrical wire, permanently attached at one end to the radiation detector and permanently attached at the other end to the electrometer module, for transmitting the electrical impulse signals from the radiation detector to the electrometer module. A further aspect of the invention is said electrometer module further including a memory for storing a plurality of configuration constants specific to the radiation detector.

The present invention is also directed toward a dosimetry system including the above described dosimeter and a computer. The computer, in response to receiving a plurality of the counts from said electrometer module, converts the counts into a measurement of said amount of radiation. A further aspect of the present invention directed toward the dosimetry system is that the computer includes means for accessing the electrometer module to obtain the configuration constants.

The dosimeter of the present invention uses dedicated solid state radiation detectors that are permanently connected to the electrometer module, thereby preventing the radiation detectors from being changed. Using dedicated radiation detectors have a number of advantages. Their use makes unnecessary the need to continuously recalibrate the dosimeter for different radiation detectors, as must be done with the prior art dosimeters that use many different types and sets of radiation detectors. Moreover, having a dosimeter that uses only one set of detectors, as opposed to many different sets of radiation detectors, reduces costs and eliminates errors that may occur from user selection of the wrong radiation detector.

On the hand, the dosimetry system of the present invention makes use of the substantial processing power of a standalone computer in executing the dosimetry application software, with its extensive databases, to accurately calculate a measurement of radiation. This is in contrast to the practice of the prior art dosimeters which are dependent solely on the limited processing power and database capacity of the dosimeter to make these calculations. On the other hand, the dosimetry system of the present invention does not delegate all the calibration function to the standalone computer. Instead, the configuration constants needed for calibration, which are specific to a given dosimeter, remain stored in the memory of this dosimeter in the present invention. The advantage the configuration constants being stored in the memory 46 of the dosimeter of the present invention, instead of in the standalone computer, is that the dosimeter of the present invention may be used with other computers without the need for the user to keep records of these calibration constants and without the need for the user to input these configuration constants into each such different computer used with the dosimeter.

By making full use of the processing power of the computer and its databases, instead of relying upon the limited processing power incorporated into just the dosimeter, to calculate the radiation dose received by a patient, a more accurate computation of the measurement of the radiation is obtained. In particular, the raw counts from the dosimeter may be multiplied by a calculated configuration factor, a configuration adjustment and a user correction inputted by the user to produce a measurement of radiation as shown by the following equation:

Radiation=(Measured counts)(Configuration factor) (Configuration adjustment)(User correction)

BRIEF DESCRIPTION OF THE DRAWINGS

FIG. 18 is a table showing a data file of a measurement report of the dosimetry application software of the present invention.

FIG. 19 is a table showing a data file of a measurement sample of the dosimetry application software of the present invention.

FIG. 20 is a table showing a data file of a measurement log of the dosimetry application software of the present invention.

FIG. 21 is a table showing a database file for the dosimetry application software of the present invention.

FIG. 22 is a table showing a database file for the dosimetry application software of the present invention.

DETAILED DESCRIPTION OF THE PREFERRED EMBODIMENTS

Figure 1:
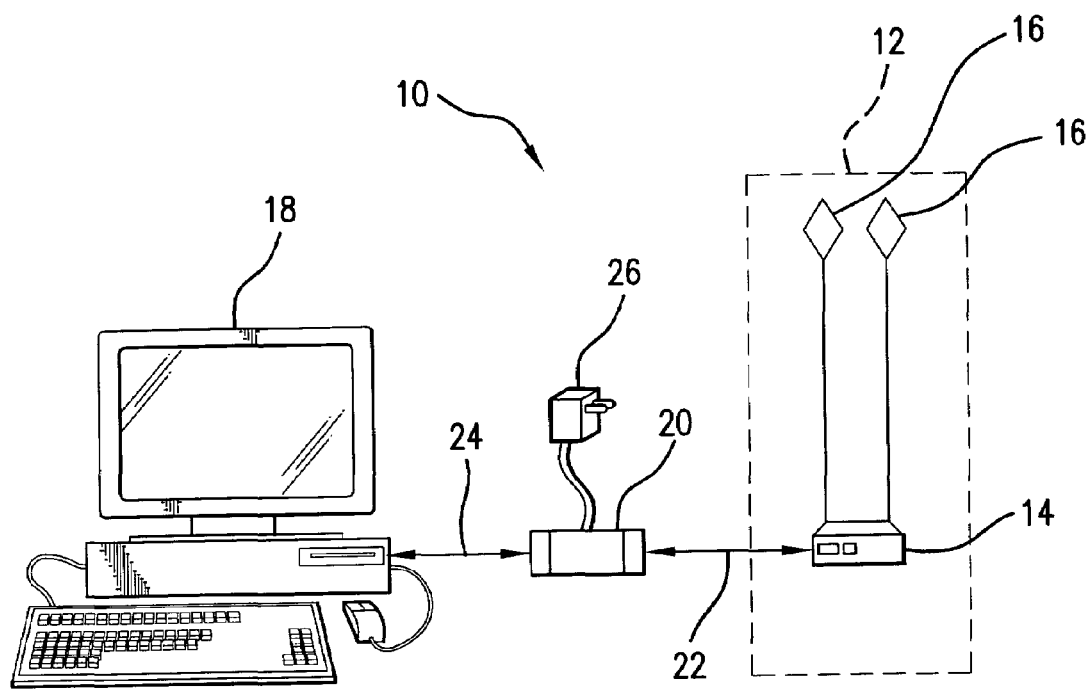
FIG. 1 is a diagram showing of the dosimetry system in accordance with the present invention.

Referring initially to FIG. 1 of the drawings, there is shown a dosimetry system, generally referred to by reference numeral 10, for conducting dosimetry verification measurements for a patient undergoing radiation therapy with high-energy photon or electron beam radiation. The dosimetry system 10 includes a dosimeter 12 having an electrometer module 14 and a pair of dedicated radiation detectors 16. The radiation detectors 16 are solid state (diode) detectors which are permanently attached to the electrometer module 14. The dosimetry system 10 further includes a computer 18. The electrometer module 14 is electrically coupled to a computer isolator box 20 via a serial cable 22. The isolator box 20 is connected by way of serial cable 24 to the computer 18.

In operation, the electrometer module 14 measures the charge generated by the radiation detectors 16, formats the information and sends the data to the computer 18 at the request of the computer 18. The computer isolator box 20 provides electrical isolation from the computer 18 to the electrometer module 14 and ultimately the patient. In addition, an isolated AC power adapter 26 provides electrical isolation to AC mains power. The computer 18 is the human interface for the system and provides for all control, data processing, data storage, and reports required of the system. More specifically, the dosimeter 12 preferably sends its data to the computer 18 that executes a software dosimetry application for processing the data. The data from the dosimeter 12 will be raw data, namely, counts that will require calibration. This preferably is achieved with a configuration routine that converts the raw counts into radiation units. The dosimeter 12 is illustrated in FIGS. 1–11, whereas the application software for processing digital count data from the dosimeter is illustrated in FIGS. 12–20.

Figures 2A, 2B, 2C:
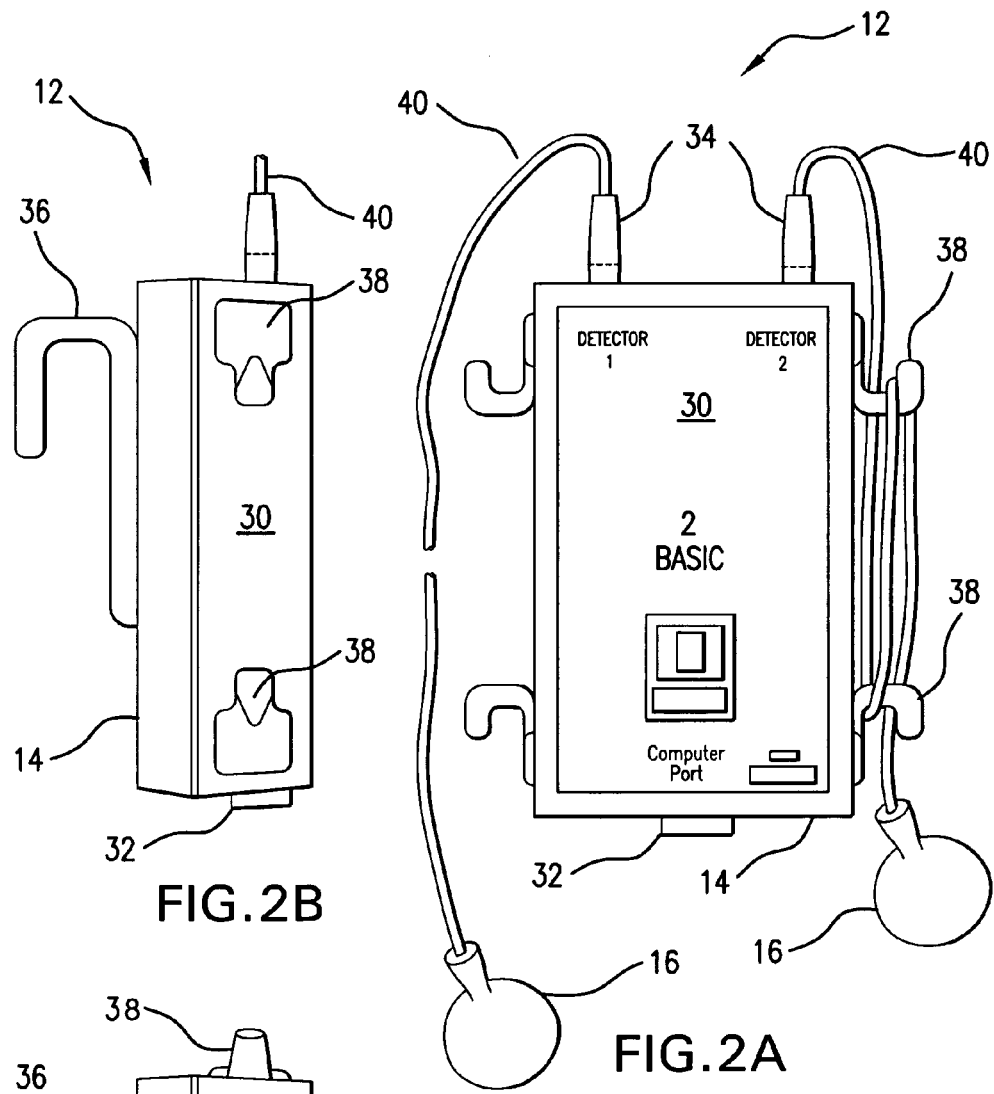
FIG. 2A is a front planar view of a dosimeter of the dosimetry system in accordance with the present invention.
FIG. 2B is a side planar view of the dosimeter in accordance with the present invention.
FIG. 2C is a top planar view of the dosimeter in accordance with the present invention.

FIG. 2A is a front planar view of an electrometer module 14 of the present invention; FIG. 2B is a side planar view of a dosimeter 12; and FIG. 2C is a top planar view of the dosimeter 12. Referring to FIGS. 2A through 2C, there are shown front, side, and bottom views, respectively, of a preferred embodiment of a case 30 for the dosimeter 12 that includes a data port 32 for electrical coupling to the computer isolation box shown in FIG. 1 or other data processing device or to a transmitting device, such as a phone line, LAN, intranet, Internet, and the like for transfer of the information to a processor or to storage or other desired destination. The data port 32 may be in the nature of a parallel port, modem connection, parallel port, serial port, USB port, infrared, phone jack, or any other port suited to the purpose of transmitting data. Additionally, more than one type of port may be provided to allow greater flexibility to the user. The radiation detectors 16 may be plugged into the electrometer module 14 using conventional jacks 34. A main hook 36 allows the dosimeter 12 to be hung on the patient couch or bed. One or more pairs of smaller hooks 38 will preferably be provided for coiling the diode wires 40 when the unit is not in use. Generally speaking, the unit will preferably be no more than three to four inches wide, four to six inches high, and one to two inches thick. Properly constructed, the dosimeter 12 of the invention is easily held in the hand and weighs less than one pound.

Figure 3:
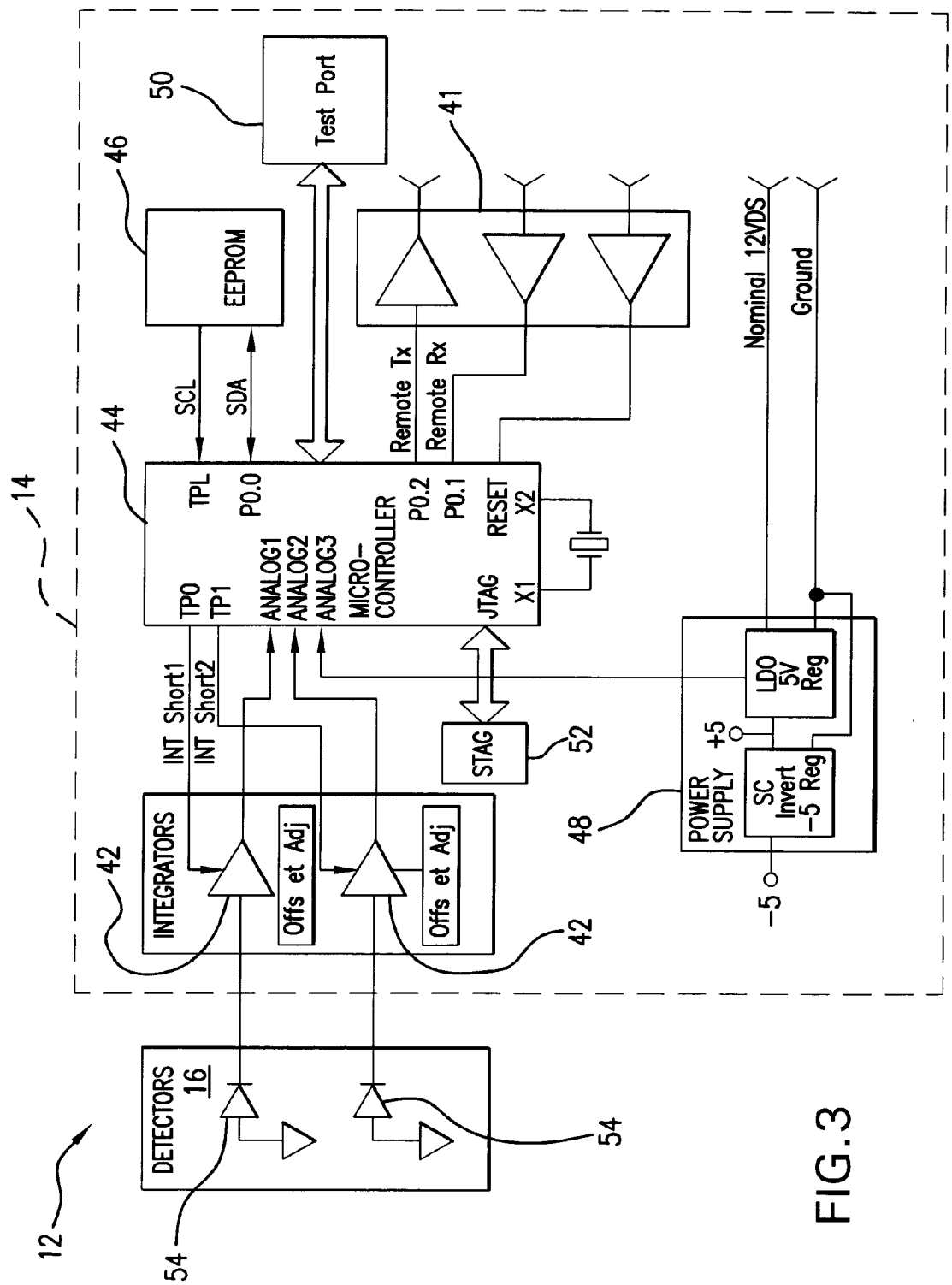
FIG. 3 is a high level electrical schematic of the dosimeter in accordance with the present invention.

FIG. 3 is a high level, electrical schematic of the composite circuitry of dosimeter 12 of the present invention. The fundamental function of the circuitry of the dosimeter 12 is to receive electrical impulses from one or more solid-state radiation detectors 16, preferably diodes, and convert these signals into a count, which is then outputted to a data or communications port 41. In the embodiment shown, the communications port 41 is in the form of a RS-232 serial port. Those skilled in the art may easily adapt to any other type output, such as a USB port, network port, infrared, and the like. Alternatively, radio transmitting means may be provided to send the data via RF. Generally, diodes for use as radiation detectors 16 will have an energy range of from 6 MeV to 20 MeV (Million electron volts).

The dosimeter 12 shown in FIG. 3 the data acquisition portion of the dosimetry system. Referring to FIG. 3, the major subsystems of the dosimeter are identified as follows: a pair of radiation detectors 16, a pair of integrators 42, a microcontroller 44, non-volatile memory 46, the communication port 41, a power supply 48, a test port 50 and a JTAG port 52.

The radiation detectors 16 are RadDose radiation detectors that have been used for several years as patient dose detectors. The basic construction of the each detector 16 is 2 special silicon diodes electrically connected in parallel. They are mounted in a configuration to optimize for angular dependence, then encapsulated and covered with a FDA approved ABS plastic cover. The detectors 16 are connected to the electrometer module 14 via the diode wires 40, which take the form of low noise coax cables with each cable being 2 meters long. Each detector 16 includes a diode 54 connected such that its cathode is towards the integrator 42 to which it is coupled, and its anode is grounded. During radiation, the current generated will flow negatively or out of the integrator 42. The charge generated by the detectors 16 is nominally 1 nC per cGy. Variations in output of +/−5% are normal from detector 16 to detector 16.

The two integrators 42 in the electronic module 14 are identical, and all information related to one is applicable to the other. The purpose of the integrators 42 is to take the small charge generated by the radiation detectors 16 and convert it to a low impedance voltage signal measurable by the analog to digital converter, to be described hereinafter.

Figure 4:
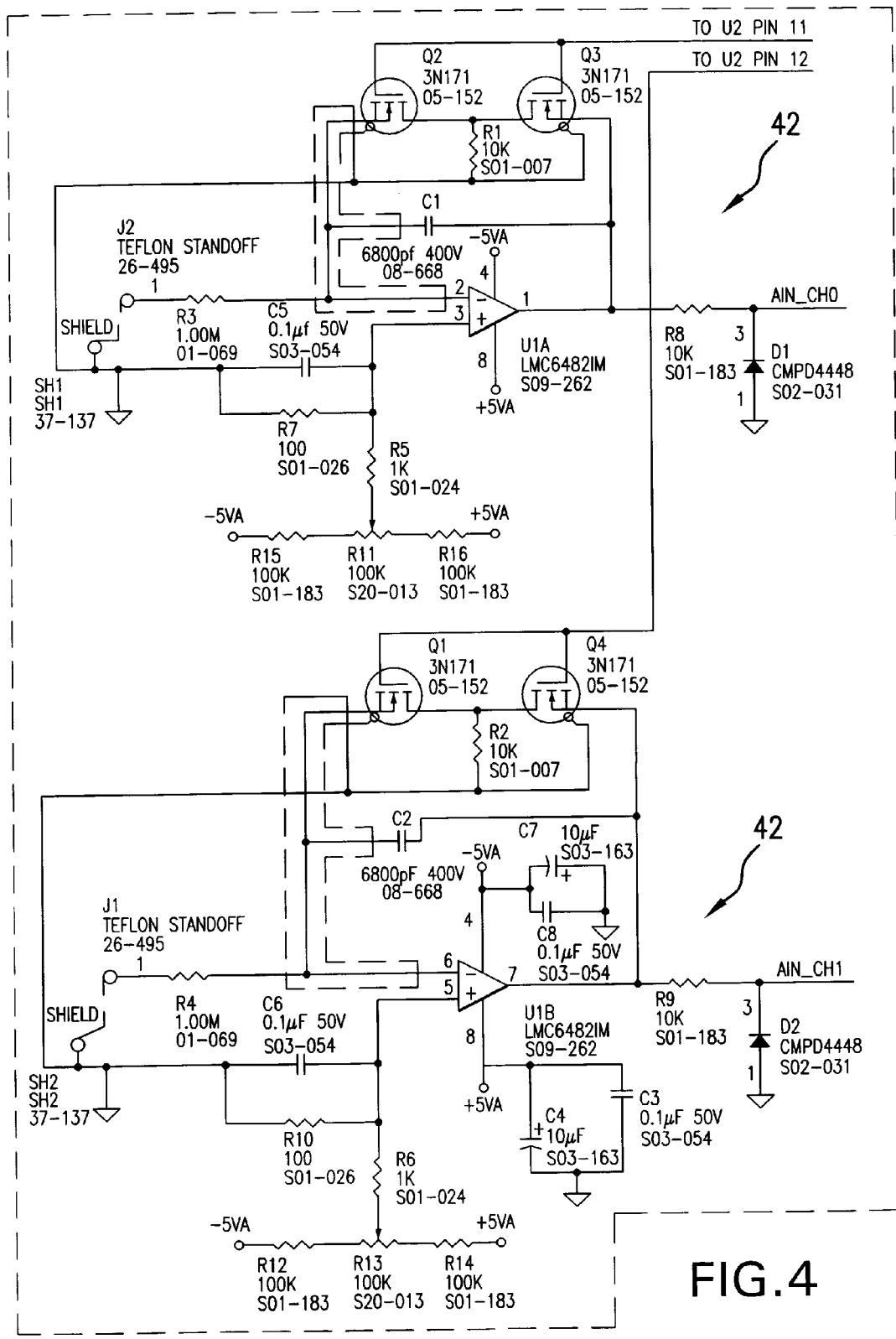
FIG. 4 is a high level schematic of signal integrators of an electrometer module of the dosimeter in accordance with the present invention.

FIG. 4 is high level schematic of the integrators 42 of an electrometer module 14 of the dosimeter, thereby supplementing the description of the integrators 42 provided with respect to FIG. 3. More specifically, the higher level schematic of FIG. 3, which provides the composite circuitry for the dosimeter 12, is broken up into four FIGS. 4–7, with each of these figures providing more detail than was provided in FIG. 3.

Referring to FIG. 4, the two integrators 42 are essentially identical in structure and operation, so only the upper one will be described in detail. The integrator 42 includes an operational amplifier U1A and a capacitor C1, which forms the heart of the integrator 42 on channel 1. Amplifier U1A is configured to be a charge feedback-inverting amplifier. The inverting input of the amplifier U1A is held at virtual ground, referenced to the non-inverting input. The amplifier U1A maintains this virtual ground by feeding back charge to the inverting node through the integration capacitor C1. Holding the inverting input at virtual ground causes the radiation detector (now shown) to operate in the shorted junction mode, which reduces leakage currents (more discussion latter). In addition, as more charge is transferred to the node to maintain virtual ground, the amplifier U1A must increase the voltage across the capacitor according to the following relationship:

$$Q=CV$$

Q is the charge in coulombs, C is the capacitance in Farads, and V is the voltage across the capacitor in Volts. The charge generated by the detectors is nominally 1 nC/cGy. The capacitor selected is 6800 pF and the rail voltage for the amplifier U1A is 5 Volts. This implies the charge on the capacitor at 5 Volts is 34 nC or equivalent to 34 cGy.

To extend the dynamic range of the integrator 42 is beyond 34 cGy, a "high speed" shorting switch was implemented across the integration capacitor. Two MOSFET transistors Q2 and Q3 form the switch. The switch had to meet the following 2 criteria: (1) the leakage must be less than 350 fA and (2) time to reset the integrator and open again must not introduce errors greater than 0.05%. The configuration of the two 3N171 MOSFET transistors Q2 and Q3 is to reduce leakage current. The minimum impedance of the 3N171 at 0 $V_{gs}$ is 1 G Ohm. A resistor R1 sinks the leakage current to ground with a voltage drop of less than 0.05 mV. TQ2 s leakage current is then 0.05 mV across 1 G Ohm or less than 50 fA. This configuration can tolerate up to a 300 uV offset voltage and still have leakage of less than 350 fA.

The required time to reset the integrator 42 is controlled by the RC time constant of the integration capacitor and the "on" impedance of the MOSFETS. The "on" resistance is 200 ohms for the transistors Q2 and Q3. The two transistors Q2 and Q3 in series generates a time constant of 2.7 us. The minimum time to discharge the integrator 42 99.9% takes 7 time constants or 18.9 us. Software (discussed hereinafter) holds the integrator 42 in reset for 200 us, 10 times the required time. At 100 cGy/min, the lost charge is 3.3 pC. The software sets the reset threshold at 2.5V, therefore the minimum charge at reset is 17 nC this results in an error of less than 0.02%.

A network of resistors R5, R7, R11, R15, R16, and capacitor C5 forms the offset adjustment for the integrator 42. The range of adjustment is approximately is +/−3 mV. This gives good adjustment control below 100 uV approximately 10 degrees of rev per 100 uV. The LMC6842 op-amp has a typical offset of 10 OuV with maximum offset being 3 mV. Even under worst case conditions the offset will not exceed 200 uV. The principal reason for reducing offset voltage is leakage current due to applied voltage across the radiation detectors and the reset switch. From the earlier discussion on the switch an offset of 200 uV will have a worst case leakage of 250 fA. The radiation detectors minimum impedance is 500M Ohms which yields a leakage current of 400 fA and the typical amplifier leakage is less than 100 fA. The total worst case calculated leakage is 750 fA, which is less than the specification of 800 A.

Resistors R3 and R4 decouple the electrometers from the radiation detectors. This is to protect the input amplifier from damage in the case of ESD or other large transients. Networks R8, D1 and R9, D2 protect the inputs of the microcontroller should the output of the amplifiers go negative by more than 1 diode drop. The lines to the gates of the MOSFETS are from the microcontroller and provide the signaling to reset the integrator when appropriate.

The parts list for the circuitry of the integrators 42 is provided in TABLE I below:

TABLE I

| PART | REFERENCE DESIGNATION |
|---|---|
| MOSFET transistors 3N171, 05-152 | Q2, Q3, Q1, Q4 |
| Resistors 1K, s01-024 | R5, R6 |
| Resistors 10k, s01-007 | R1, R2 |
| Resistors 10k, s01-183 | R8, R9 |
| Resistors 100k, s01-026 | R7, R10 |
| Resistors 100k, s01-183 | R15, R12, R16, R14 |
| Resistors 100k, s20-013 | R11, R13 |
| Resistors 100 M, 01-069 | R3, R4 |
| Capacitors 6800 pF 400 V, 08-668 | C1, C2 |
| Capacitors 0.1 uF, 50 V, 08-668 | C5, C6 |
| Capacitors 10 uF, s03-163 | C7, C4 |
| Capacitors 0.1 uF 50 V, s03-054 | C8, C3 |
| Op-Amps LMC6482IM, s09-262 | U1A, U1B |
| Diodes CMPD4448, s02-031 | D1, D2 |
| Teflon standoff, 26-495 | J2, J1 |
| Shield, 37-137 | SH1, SH2 |

Figure 5A:
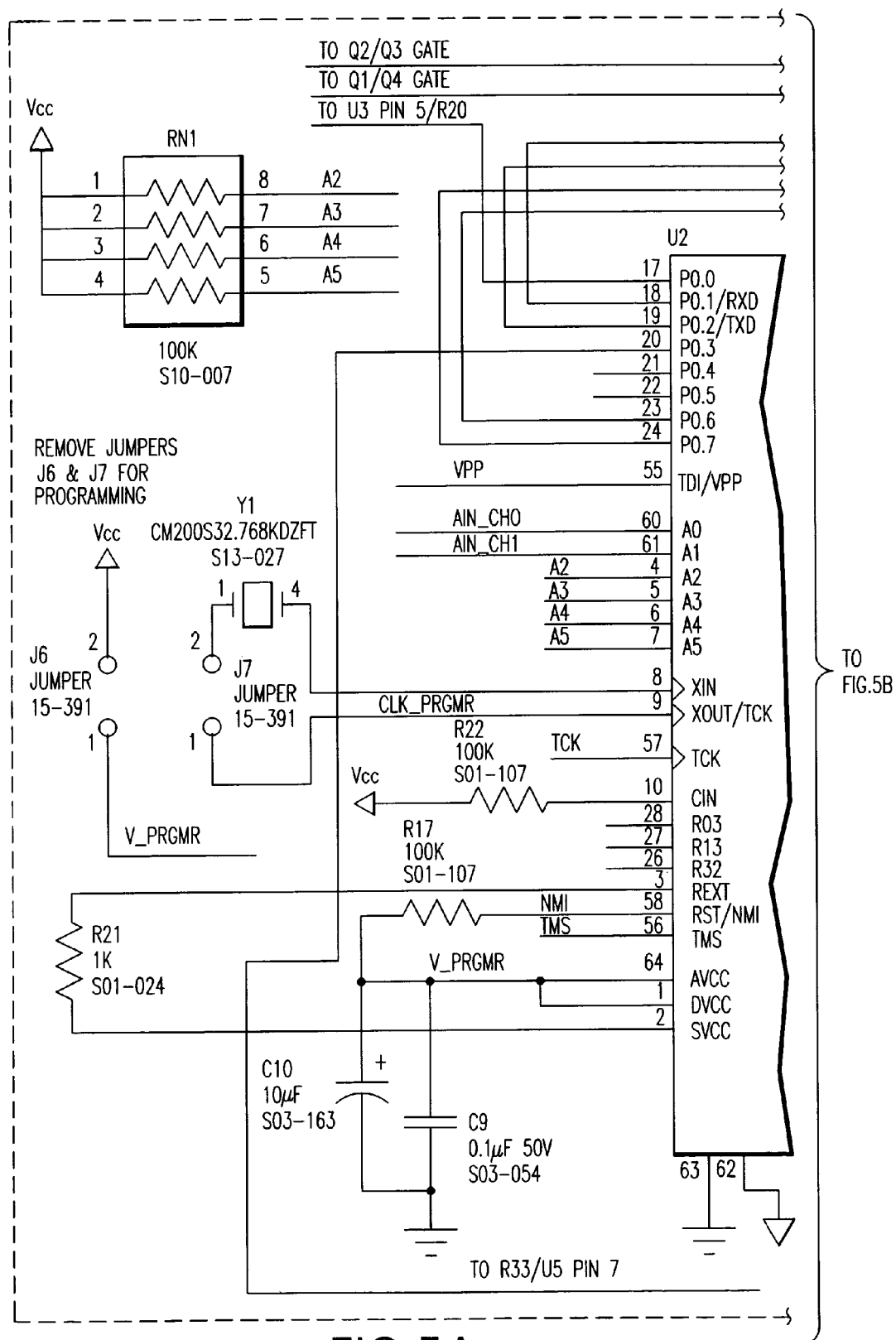
FIG. 5 is a high level schematic of a microcontroller of the electrometer module in accordance with the present invention.
Figure 5B:
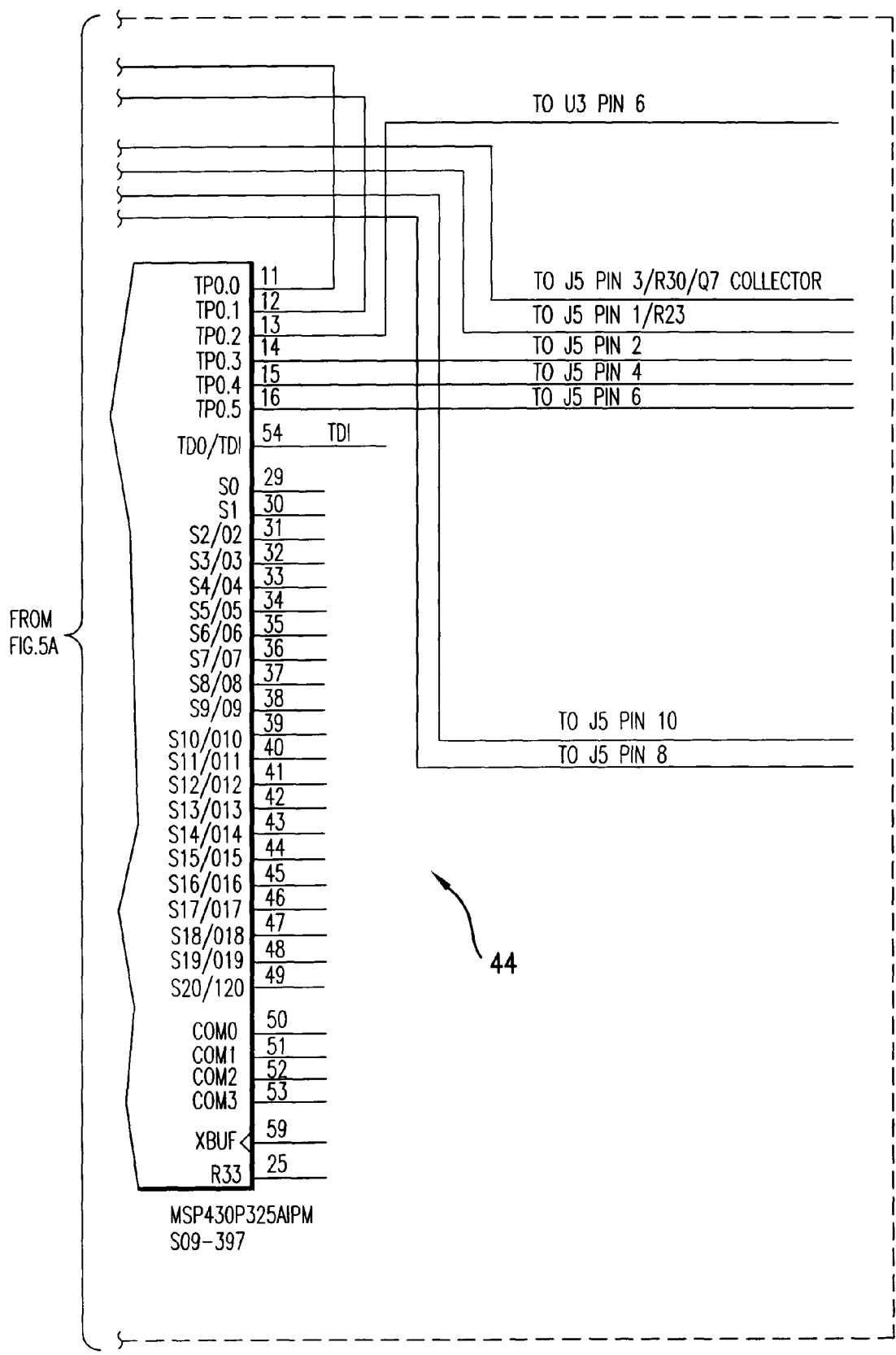
Figure 6:
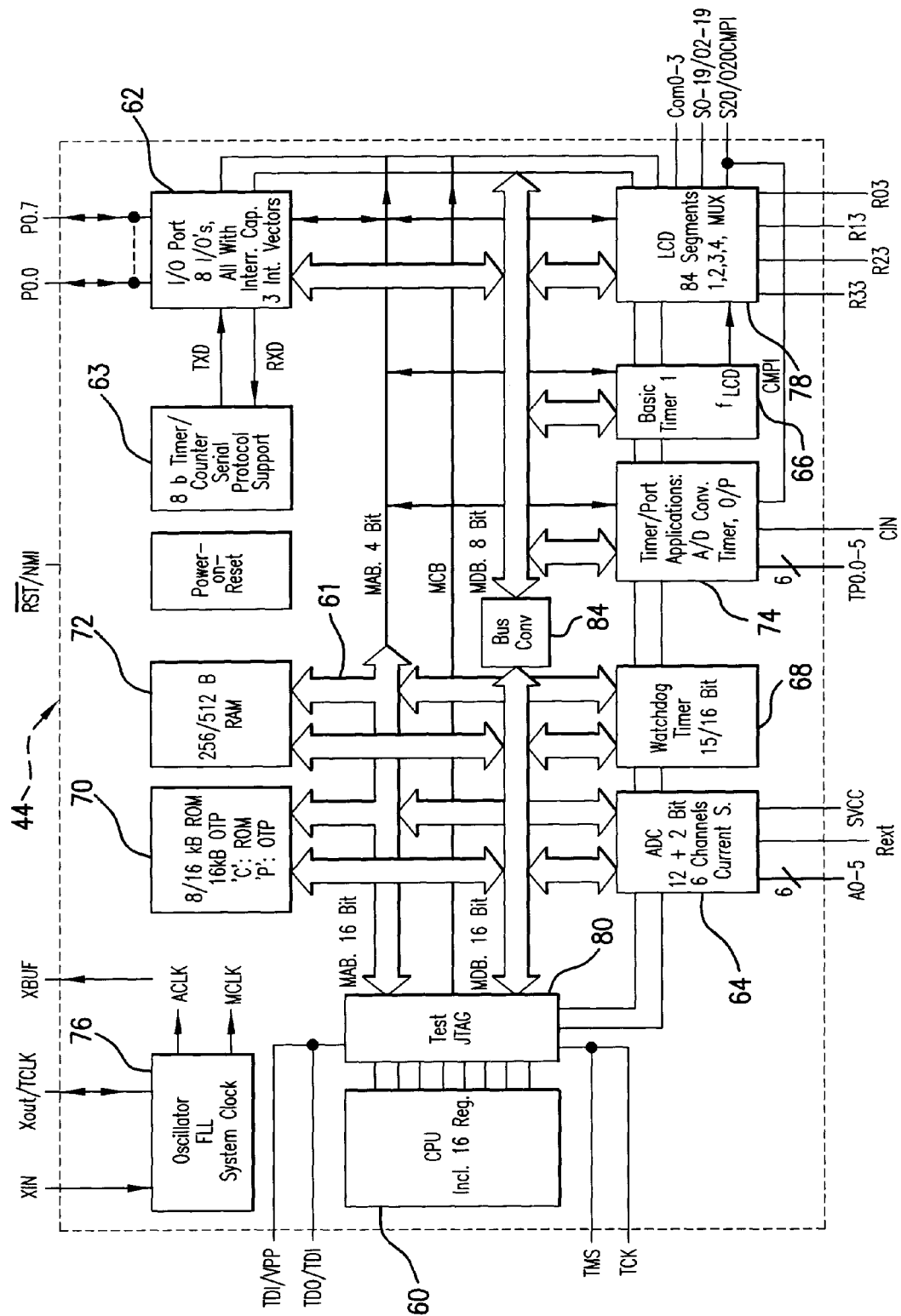
FIG. 6 is a functional block diagram of the microcontroller of the electrometer module in accordance with the present invention.

Referring to FIG. 5, the lead connections for the microcontroller 44 (U2 chip) are provided which show its electrical interconnection with the remaining components of the electrometer. The preferred embodiment the microcontroller 44 is a Texas Instrument MSP430 P325 A microprocessor. The key features of the microcontroller 44 are outlined below with reference to a functional block diagram of the microcontroller 44 provided in FIG. 6. The microcomputer 44, with a 16 bit CPU 60, is very suited for this type of application due to it high degree of integration 16 bit internal data structure and low power operation, such as the 16 bit wide bus system 61. One 8-bit I/O port (Port0) 62 is implemented. The 8-bit port 62 uses six control registers (not shown) to give maximum flexibility of digital input/output to the application including: (1) all individual I/O bits are programmable independently; (2) any combination of input, output, and interrupt conditions is possible; (3) interrupt processing of external events is fully implemented for all eight bits of port P0; and (4) read/write access to all registers with all instructions. The six registers include: input register which contains information at the pins; output register which contains output information; direction register which controls direction; interrupt flags which indicates if interrupt(s) are pending; interrupt edge select which contains input signal change necessary for interrupt; and interrupt enable which contains interrupt enable pins. All six registers contain eight bits except for the interrupt flag register and the interrupt enable register. The two least significant bits (LSBs) of the interrupt flag and interrupt enable registers are located in the special functions register (SFR). Three interrupt vectors are implemented, one for Port0.0, one for Port0.0, and one commonly used for any interrupt event on Port0.2 to Port0.7. The Port0.1 and Port0.2 pin function is shared with an 8-bit Timer/Counter 63.

The microcontroller 44 includes an analog-to-digital converter (ADC) 64, which is a cascaded converter type that converts analog signals from VCC to GND. It is a 12+2 bit converter with a software or automatically-controlled range select. Five inputs can be selected for analog or digital function. A ratiometric current source can be used on four of the analog pins. The current is adjusted by an external resistor (not shown) and is enabled/disabled by bits located in the control registers. The conversion is started by setting the start-of-conversion bit (SOC) in the control register and the end-of-conversions sets the interrupt flag. The analog input signal is sampled starting with SOC during the next twelve MCLK clock pulses. The power-down bit in the control register controls the operating mode of the ADC peripheral. The current consumption and operation is stopped when it is set. The system reset PUC sets the power-down bit. The ADC 64 as used in the present invention utilizes all 14 bits or 16384 counts. This equates to a resolution 305 uV, 2.07 pC or $2.07 \times 10^{-3}$ cGy.

A Basic Timer1 (BT1) 66 divides the frequency of MCLK or ACLK, as selected with the SSEL bit, to provide low frequency control signals. This is done within the system by one central divider, the BT1 66, to support low current applications. The BTCTL control register contains the flags which controls or selects the different operational functions. When the supply voltage is applied or when a reset of the device (RST/NNI pin), a watchdog overflow (block 68), or a watchdog security key violation occurs, all bits in the register hold undefined or unchanged status. The user software usually configures the operational conditions on the BT1 66 during initialization. The Basic Timer1 66 has two 8-bit timers which can be cascaded to a 16-bit timer. Both timers can be read from and written to by the embedded software (processor has typical ROM and RAM memories 70 and 72). Two bits in the SFR address range handle the system control interaction according to the function implemented in the Basic Timer1 66. These two bits are the Basic Timer1 interrupt flag (BTIFG) and the Basic Timer1 interrupt enable (BTIE) bit.

A Timer/Port module 74 has two 8-bit counters, an input that triggers one counter, and six 3-state digital outputs. Both counters have an independent clock-selector for selecting an external signal or one of the internal clocks (ACLK or MCLK). One of the counters has an extended control capability to halt, count continuously, or gate the counter by selecting one of two external signals. This gate signal sets the interrupt flag, if an external signal is selected, and the gate stops the counter. Both timers can be read from and written to by software. The two 8-bit counters can be cascaded to a 16-bit counter. A common interrupt vector is implemented. The interrupt flag can be set from three events in the 8-bit counter mode (gate signal, overflow from the counters) or from two events in the 16-bit counter mode (gate signal, overflow from the MSB of the cascaded counter). The functional diagram also shows other conventional elements used in a conventional manner, e.g., oscillator 76, LCD block 78, test JTAG block 80, power-on-reset block 82, and bus conversion block 84.

Figure 7:
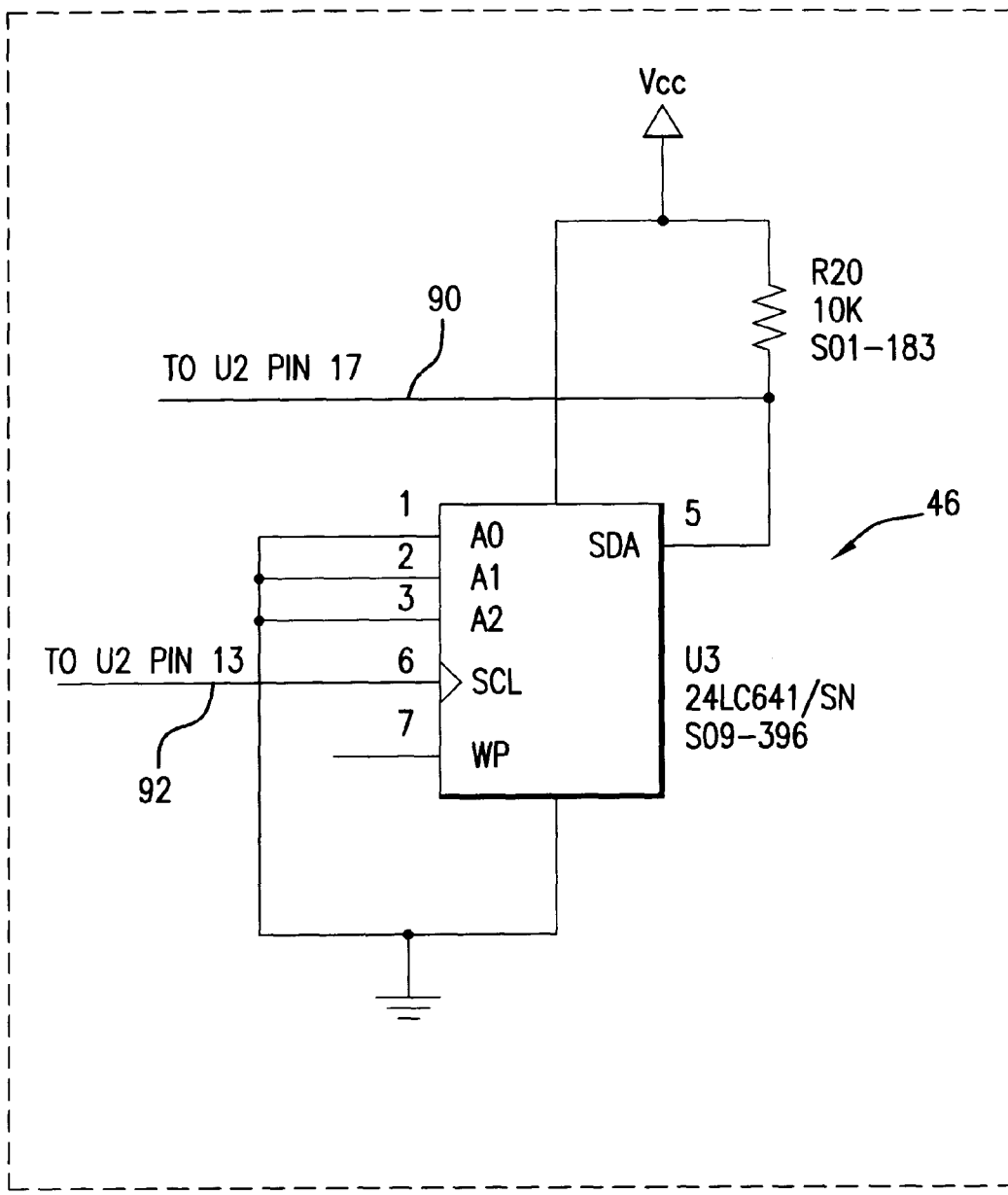
FIG. 7 is a high level schematic of an external memory for the microcontroller in accordance with the present invention.

FIG. 7 shows a detailed schematic of the memory 46 for the microcontroller (not shown) which was generally shown in FIG. 3. In the preferred embodiment the memory 46 is a 24 LC64 EEPROM chip, identified in FIG. 7 by U3, part no. s09-396, which stores calibration constants for the detectors. The memory 46 is non-volatile memory, preferably, but not necessarily, an EEPROM. The calibration constants typically stored in the memory 46 for each detector is the serial number, factory calibration, date first used, accumulated dose for low energy photons, high energy photons, low energy electrons, and high energy electrons. The computer 18 of FIG. 3 can read and write these values to the memory 46. The advantage the calibration constants being stored in the memory 46 of the dosimeter 12, instead of in the computer 18, is that the dosimeter can be used with other computers without requiring the operator to keep records of these calibration constants specific to this particular dosimeter or to have to input into and configure each such different computer with the constants specific to this particular dosimeter 12. Counts are only accumulated during the measurement and sent to the PC where they are converted into a actual reading by multiplying the counts by the configuration factor.

The memory 46 supports a bi-directional 2-wire bus and data transmission protocol for data transfers in the electrometer. A device that sends data onto the bus is defined as transmitter, and a device receiving data as receiver. The buses of the electrometer have to be controlled by a master device which generates the serial clock (SCL), controls the bus access and generates the START and STOP conditions, while the 24 LC64 chip U3 works as slave. Both master and slave can operate as transmitter or receiver, but the master device determines which mode is activated. The following bus protocol has been defined: (1) data transfer may be initiated only when the bus is not busy, and (2) during data transfer, the data line must remain stable whenever the clock line is HIGH. Changes in the data line while the clock line is HIGH will be interpreted as a START or STOP condition. In FIG. 7, a resistor R20 (s01-183) has a value of 10K. The memory 46 is electrically coupled to pins 17 and 13 of the microcontroller 44 of FIGS. 5 and 6 by a pair of data lines 90 and 92, respectively.

Figure 8:
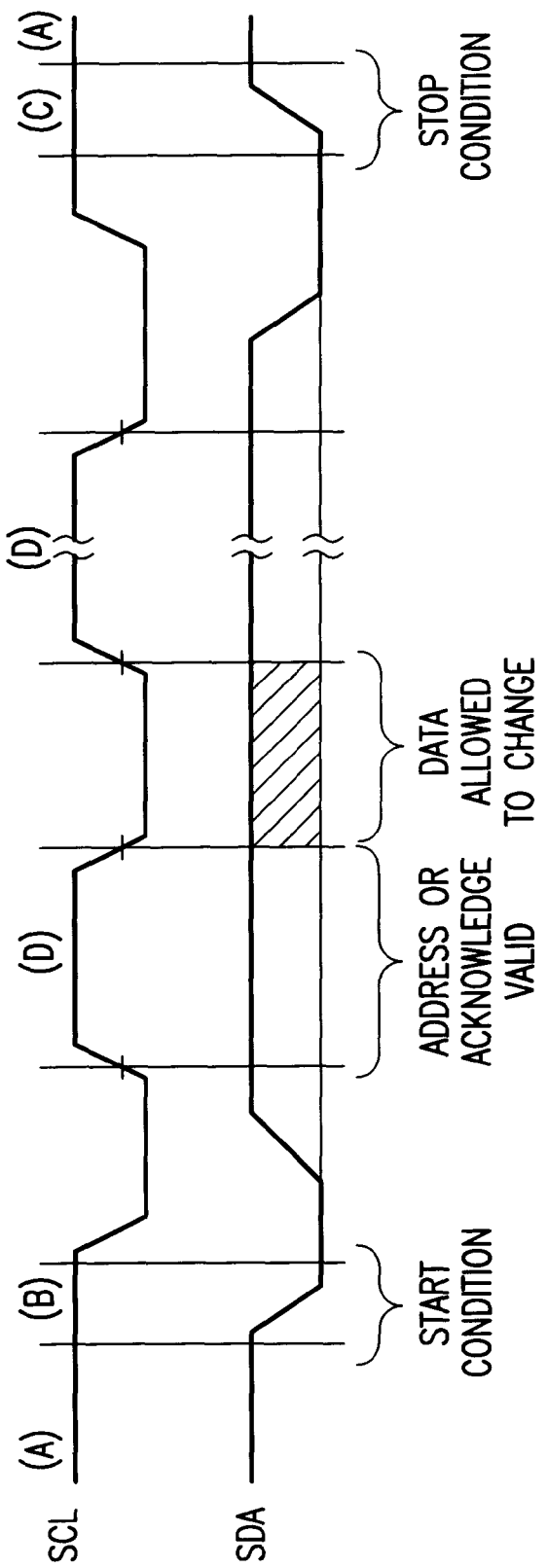
FIG. 8 is a timing diagram for bus and data transfer control for the electrometer module in accordance with the present invention.

FIG. 8 is a timing diagram for buss access and data transmission, as controlled by the microcontroller 44 of FIG. 3. Each receiving device, when addressed, is obliged to generate an acknowledgment after the reception of each byte. The master device must generate an extra clock pulse which is associated with this acknowledge bit. The device that acknowledges, has to pull down the SDA line during the acknowledge clock pulse in such a way that the SDA line is stable LOW during the HIGH period of the acknowledge related clock pulse. Of course, setup and hold times must be taken into account. During reads, a master must signal an end of data to the slave by not generating an acknowledge bit on the last byte that has been clocked out of the slave. In this case, the slave (24 LC64 chip U3) will leave the data line HIGH to enable the master to generate the STOP condition. The 24 LC64 chip U3 does not generate any acknowledge bits if an internal programming cycle is in progress.

Figure 9:
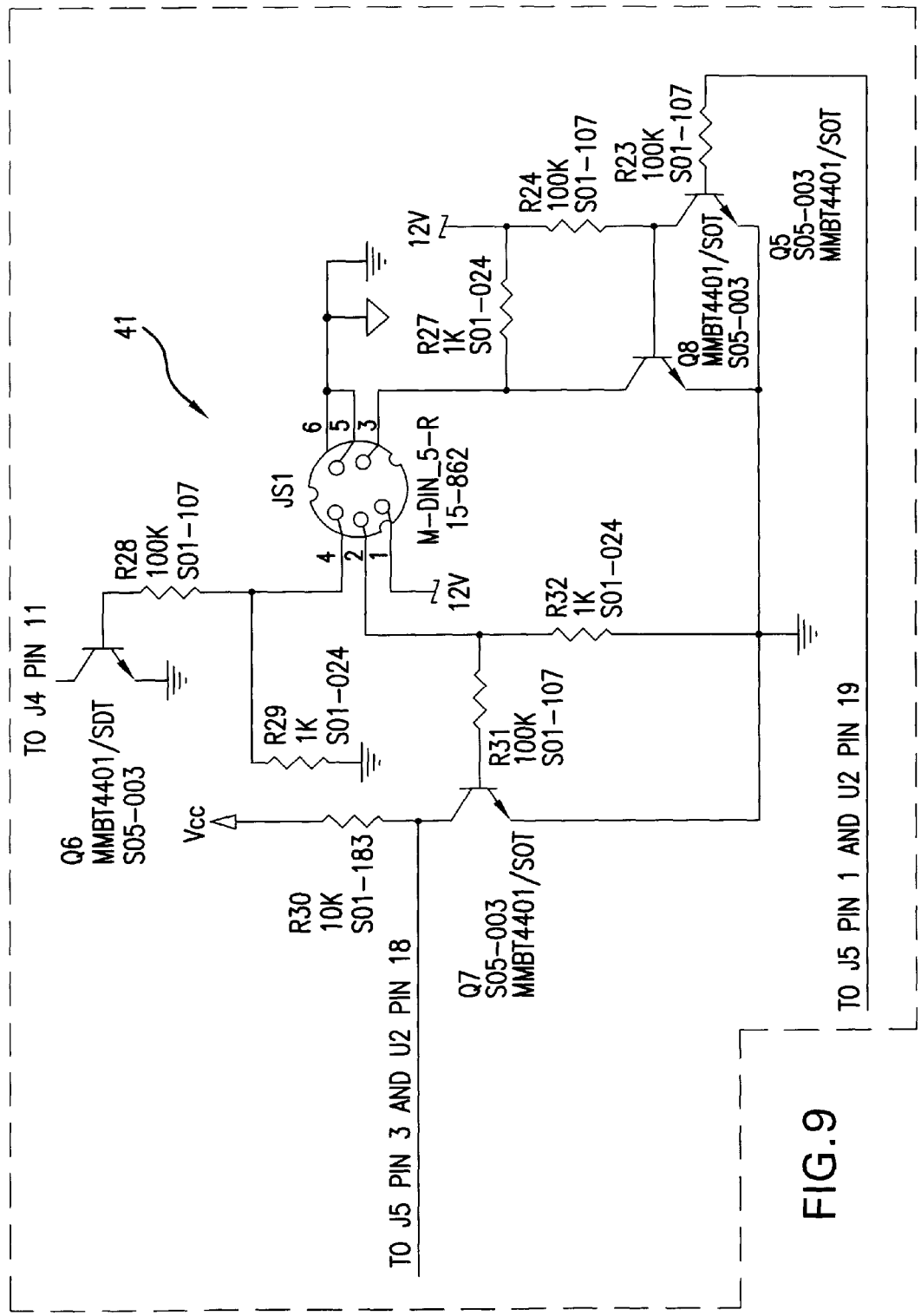
FIG. 9 is a high level schematic of a communications port of the electrometer module in accordance with the present invention

FIG. 9 is an electrical schematic of a communications port 41, which was generally described with respect to FIG. 3. The communication port 41 is the interface to the computer isolator and performs 3 functions: unregulated 12 VDC power is supplied, system reset through use of RS232 control line, and transmit receive signaling. Power is supplied to the electrometer on pin 1 of the mini DIN connector and ground on pin 5. Pin 2 of the mini DIN is the receive line and is driven by the output of an opto isolator. A resistor R32 then acts to terminate the line while a resister R31 is a current limiter to transistor Q7. The transistor Q7 inverts the signal for proper interpretation by the microcontroller 44 (see FIGS. 5 and 6) and a resistor R30 is a pull-up to provide proper voltage swing at the controller. Transistors Q8 and Q5 provide for a non-inverted transmission from the controller to the computer isolator. A resistor R27 terminates the line while R24 and R23 provide for bias and current limit for the transistors. A transmit signal from the electrometer is on pin3 of the mini DIN. A reset signal to the electrometer is on Pin 4 of the mini DIN and a transistor Q6 provides for inversion of the signal and level shifting. A resister R29 terminates the line while a resister R28 provides current limit to the transistor Q6.

A parts list for the circuitry of the communications port 41 is provided in TABLE II below:

TABLE II

| PART | REFERENCE DESIGNATION |
| --- | --- |
| Transistor MMBT4401/SOT | Q5, Q6, Q7, Q8 |
| Resistor 100K, s01-107 | R28, R31, R24, R23 |
| Resistor 1K, s01-24 | R29, R32, R27 |
| Resistor 10K, s01-183 | R30 |
| Junction M-DIN_5-R, 15-862 | JS1 |
| Transistor MMBT4401/SOT, s05-003 | Q7 |

Figure 10:
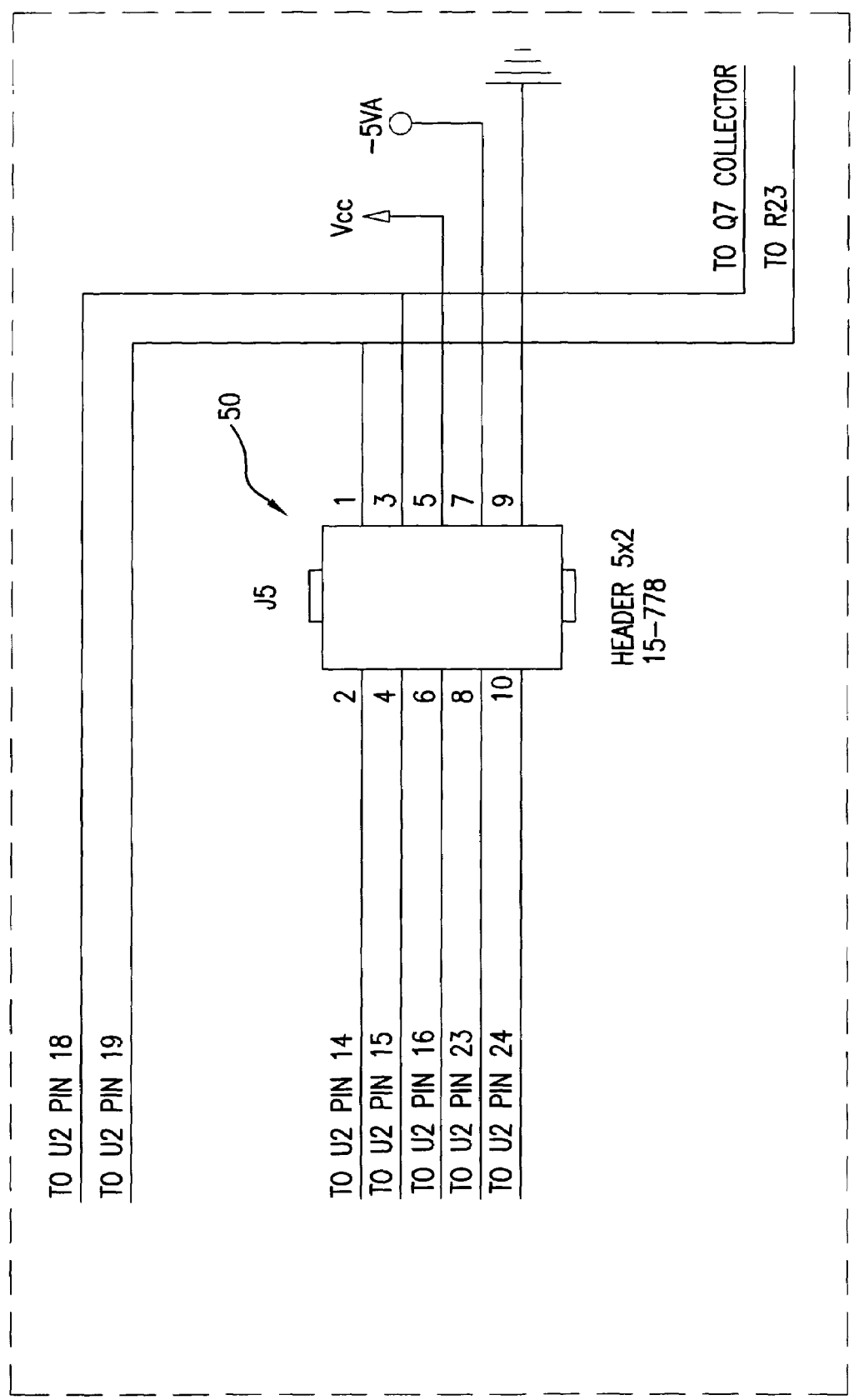
FIG. 10 is a high level schematic of a test port for the microcontroller of the electrometer module in accordance with the present invention.

Referring to FIG. 10, the test port 50 (chip J5, header 5X2, 15-778), which was first referred to in FIG. 3, is now illustrated in detail. The test port 50 on the electrometer was included to provide access to signals that would aide a technician in determining circuit faults in production. The signals available are as follows: Pin 1 (serial port receive), Pin 2 (usec delay used to reset integrator), Pin 3 (serial port transmit), Pin 4 (1 Hz timer), Pin 5 (Vcc, +5 Volts), Pin 6 (toggled each time through main software loop), Pin 7 (−5 Volts), Pin 8 (Pulsed for each received serial bit), Pin 9 (ground), Pin 10 (Pulsed for each transmitted serial bit).

Referring back to FIG. 3, the JTAG port 52 allows for on PC board programming of the MSP430P325A. JTAG (Joint Test Action Group) sanctioned by IEEE created IEEE 1149.1 for the purpose of having on chip test points. This standard implemented by Texas Instruments allows a simple means to program the MSP430. Details about this port can be found in Texas Instrument literature and IEEE 1149.1. For the purposes of this document the details are not important as the signals have been made available on 14 pin header as specified by the parallel MSP430 programmer.

Figure 11:
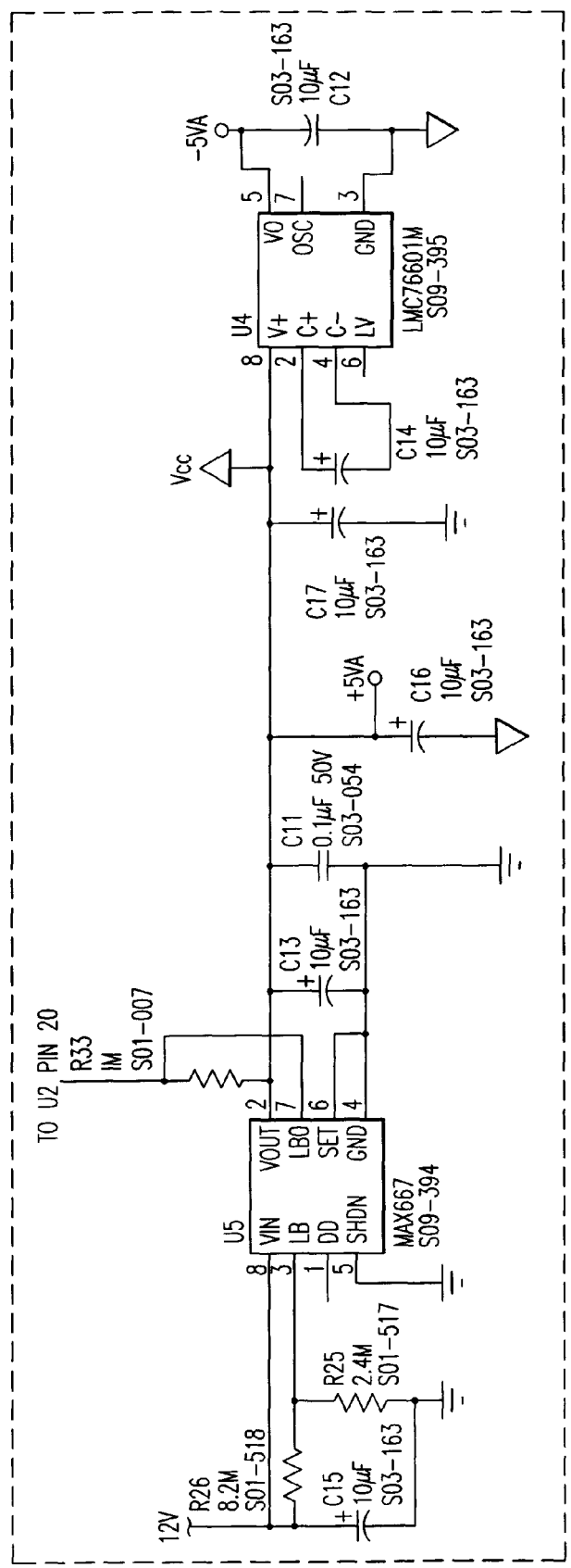
FIG. 11 is a high level schematic of a power supply for the electrometer module in accordance with the present invention.

Referring to FIG. 11, the power supply 48, as introduced in FIG. 3, is of conventional design. A parts list for the circuitry of the power supply 48 is provided in TABLE III below:

TABLE III

| PART | REFERENCE DESIGNATION |
| --- | --- |
| Resistor 1M, s01-007 | R33 |
| Resistor 8.2 M, s01-518 | R26 |
| Resistor 2.4 M, s01-517 | R25 |
| MAX667, s09-394 | U5 |
| Capacitor 10 uF, s03-163 | C15, C13, C16, C17, C14, C12 |
| Capacitor 0.1 uF, 50 V, s03-054 | C11 |
| LMC76601M, s09-395 | U4 |

With reference to FIGS. 1–11, the radiation detectors 16 may be employed with any energy or modality in most linear accelerators. In the preferred embodiment, the diode radiation detectors 16 have the following specifications: a hemispherical construction with a 5 mm flat bottom; energy range for Photon ($Co_{60}$-25 MV) and for Electrons (6 MeV–20 MeV); directional dependence of <2% tip to cable, +60 degrees from perpendicular; inherent buildup of approximately 1.2 cm $H_2O$ equivalent; standard cable length of 2 meters with low noise, coax, 1 mm diameter; linearity better than 0.2%, 0.5 Gy/min to 5.0 Gy/min; and sensitivity variation with temperature (SVWT) of <0.3% per degree centigrade. The detectors 16 provide outstanding stability while minimizing sensitivity loss and providing extended diode life. The detectors 18 use state of the art color coded diodes specially molded with hemispherical shape for direct patient skin contact. The detectors 18 provide high sensitivity, excellent linearity, and uniform output verses gantry angle of the linear accelerator. The diodes are completely water resistant and precisely engineered with high input impedance for superior drift control. The embedded software of the electrometer module 14 automatically corrects for zero offset. But those skilled in the art will recognize that these specifications may be varied without departing from the present invention.

The dosimeter 12 is very simple to learn, compact and light weight—about the size and weight of a standard-sized hand held calculator. The specifications for the electrometer module 14 are as follows: channels—2; range—rate (1 to 1000 cGy/minute) and integrated (0.1 cGy to 1000 cGy); reproducibility—+0.1 percent+1 digit; zero drift—software compensated; connectors—permanently attached detectors; environment humidity—5%–95% non condensing, storage—0 degree C. to 70 degrees C., operation—20 degrees C. to 40 degrees C.; dimensions: 4.6 inches by 1.5 inches by 2.8 inches; and weight, <1 pound. But those skilled in the art will recognized that these specifications may be varied without departing from the present invention. Hence, the invention incorporates a number of convenient features to facilitate patient dosimetry, among them stored calibrations of the detectors, ease of use, light weight, and portability.

Figure 12:
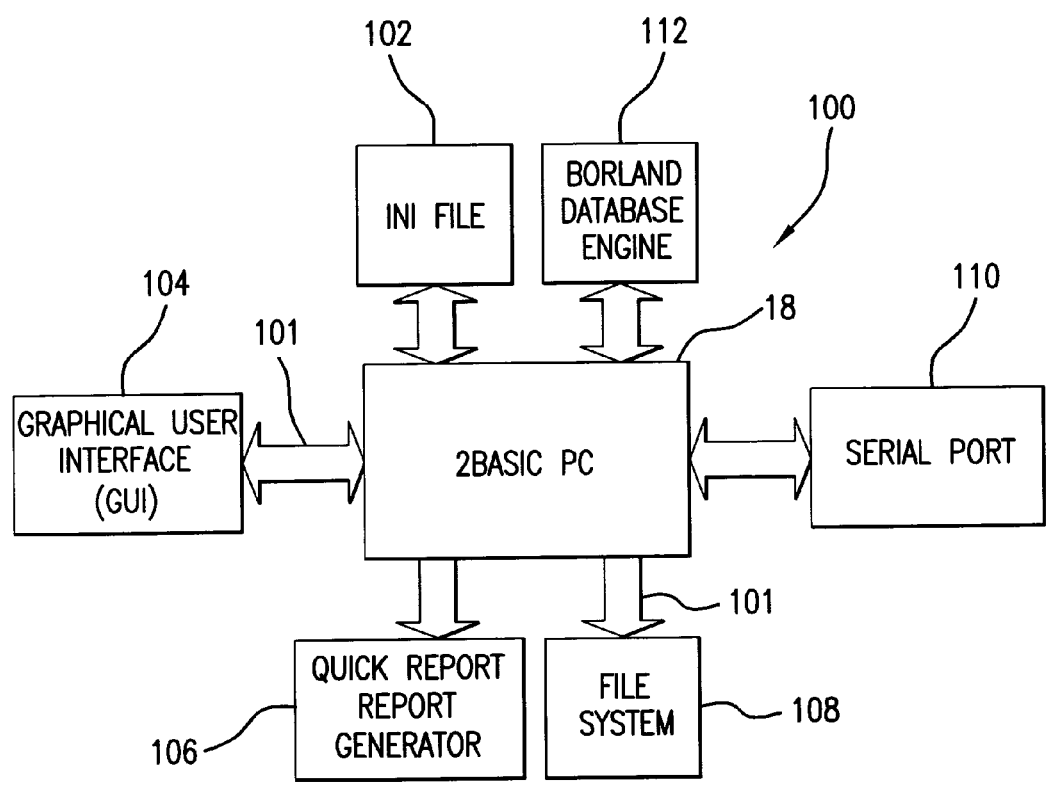
FIG. 12 is a block diagram showing the software architecture of the dosimetry application software of the present invention.

FIG. 12 is a block diagram showing the software architecture 100 of the dosimetry software application of present invention. This application runs on computer 18, which is a conventional PC running Windows 98™, ME or XP operating system. Major software interfaces 101 of this application are illustrated with respect to the computer 18; however, there are no hardware interfaces described because all control of hardware devices happens using the Windows™ API functions in a conventional manner. The C++ Builder Visual Component Library provides an Ini File 102 class to encapsulate the Windows ini functions. All ini file reads and writes will use the Ini File class. With respect to a Graphical User Interface 104, all Windows' controls and indicators are accessed through the C++ Builder Visual Component Libraries. Event handlers are written in C++ Builder to handle any relevant Windows events. With respect to a QuickReport report generator 106, C++ Builder provides a group of class libraries to access the QuickReport components. The QuickReport components are positioned on a form in a series of bands as they are to appear in the displayed report. The individual data fields on the report are linked to fields in the database. A file system 108 is accessed through the standard C I/O functions: fopen( ), fprintf( ), and fclose( ). The data files are created and written to but not read back by the application. All serial port 110 accesses occur using the standard Windows API function calls. A single corn port is opened at a time since only one electrometer (not shown) is active for each application at a time. A Borland™ Database Engine (BDE) 112 provides an interface to the data stored in the databases. The databases are setup as two TTAble components and the data is accessed through TTable methods.

Figure 13:
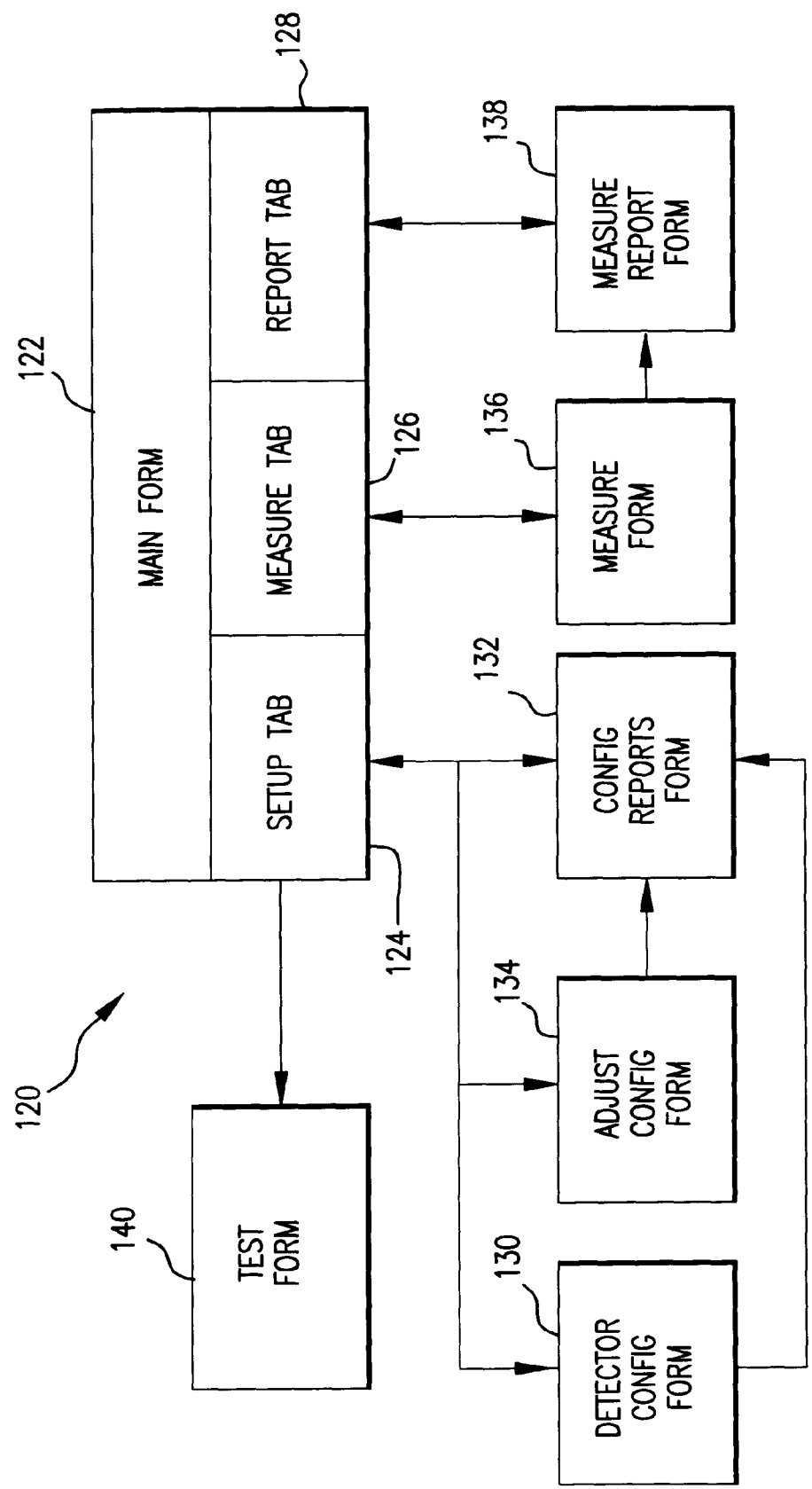
FIG. 13 is a block diagram showing the forms routine of the dosimetry application software of the present invention.

Referring to FIG. 13, a block diagram 120 of the forms used in the dosimetry application software is shown. The forms in this diagram 120 are referred to from time to time in the following discussion of the software modules of the dosimetry application software. This diagram 120 provides the top-level flow of control between the forms. A main form 122 has Set Tab 124, Measure Tab 126, Report Tab 128. Other forms include Detector Configuration Form 130, Configuration Report Form 132, Adjust Configuration Form block 134, Measurement Form 136, Measurement Report Form 138 and Test Form 140.

The following describes the different software modules of the present invention, which are grouped by functional categories. These software modules include the groups of modules: Applications Startup and Support, Measurement, Configuration, Serial communication, Data sampling, and Test modules.

The Startup and Support modules control the initial application startup for the dosimetry application software, the display of the Main form (identified by reference numeral 122 in FIG. 13), and any general purpose program support need by the application (EditList, About, and TBDataModule). These modules include the Main, EditList, About, and TBDataModule. The Main module consists of any program startup and shutdown routines, the routines associated with the Setup, Measurement, and Report tabs on the Main form (identified by the reference numbers 124, 126, and 128, respectively, in FIG. 13) and also the software to support all the visual elements on the Main form. The EditList module contains the routines to add or delete items from user generated lists and the software to support all the visual elements on the form. The About module contains the software to display an About box which lists the current version number when requested by the user. The TwoBasicPC module is a C++ Builder generated module which contains the software to startup the dosimetry application software and creates the forms used by the application. The TBDataModule module provides the container for the two databases used by this application.

Figure 14:
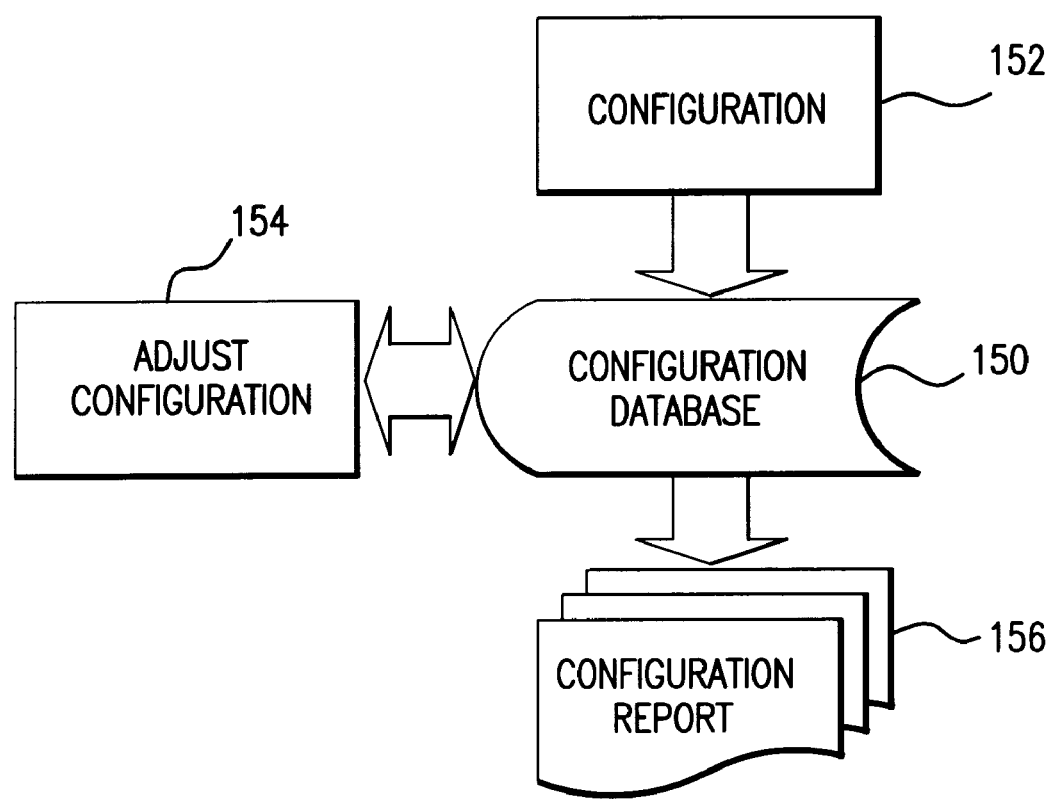
FIG. 14 is a block diagram showing the configuration procedure and database of the dosimetry application software of the present invention.

The Configuration modules control the initial detector configuration and any subsequent display or modification of the configuration data. As mentioned earlier, the dosimetry application software can read and write to the EEPROM memory in the dosimeter. In addition, since both the detector configuration and modification of the configuration data are the only functions that are password protected, a PasswordEntry module is included here as well. These Configuration modules include DetectorConfig, AdjustConfiguration and PasswordEntry modules. The DetectorConfig module consists of the routines to control the detector configuration, to display configuration data on the screen, to save configuration data to the database, and the software to support all the visual elements on the form. The AdjustConfiguration module consists of the routines to adjust a detector configuration, to view configuration reports, to delete configuration data in the database, and the software to support all the visual elements on the form. The PasswordEntry module contains the routines that allow a user to initially enter a password and then later query the user for this same password before we let him access protected operations such as creating or modifying detector configurations. Referring to FIG. 14, there is shown a configuration database 150, with the configuration procedure 152 for determining and storing in the database 150 the initial configuration data via the DetectorConfig module, and the adjustment procedure 154 for storing adjustments for the configuration data via AdjustConfiguration, and the configuration report procedures 156 for providing reports via the DetectorConfig module. Referring back to FIG. 13, the following relevant forms are provided: Detector Configuration 130, Adjust Configuration Form 134, and Configuration Reports Form 132.

Figure 15:
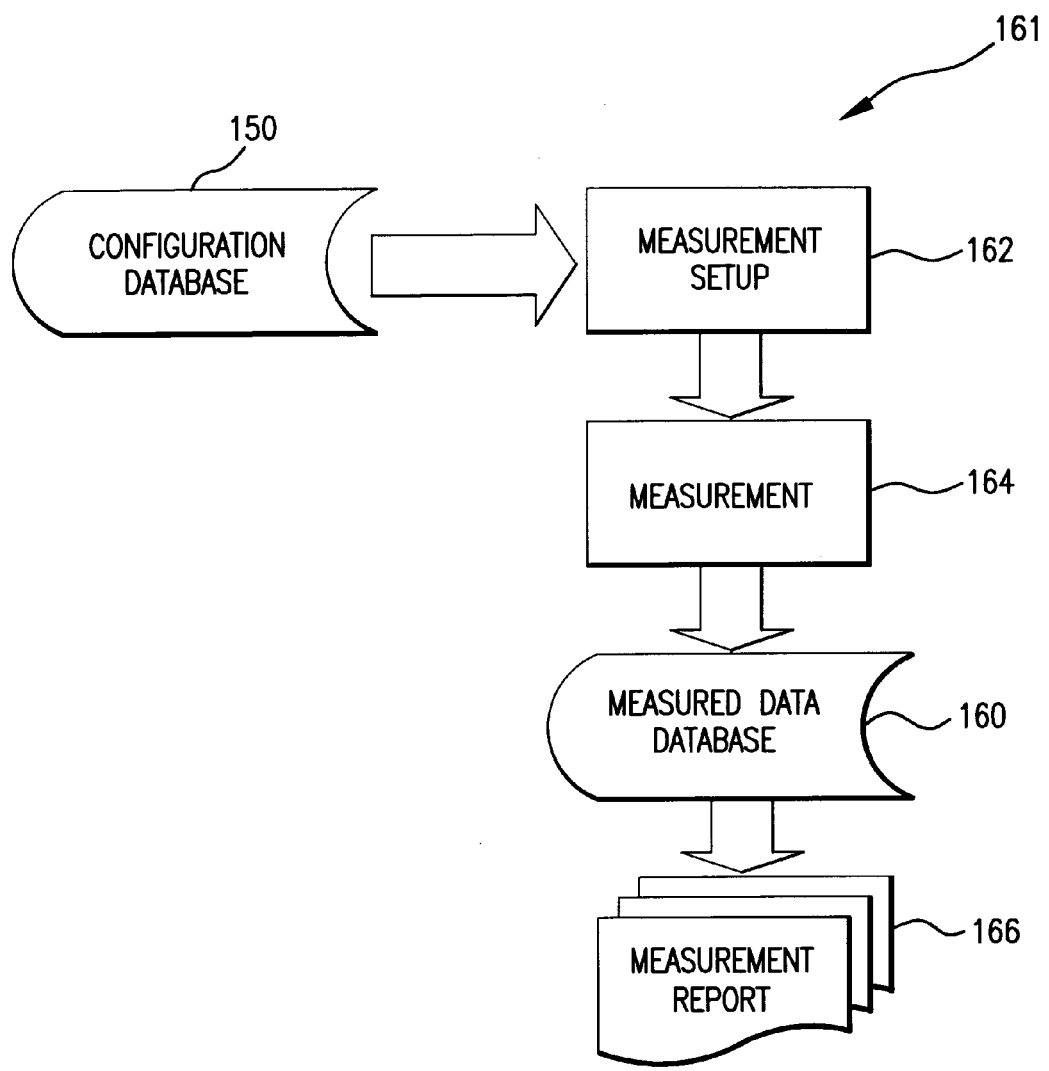
FIG. 15 is a block diagram showing the measurement procedure and database of the dosimetry application software of the present invention.

The Measurement module controls the measurement function in response to user commands. This module consists of the routines to control a measurement, to display measurement data on the screen, to save measurement data to the database, and the software to support all the visual elements on the form. Referring to FIG. 15, there is shown a measured data database 160. The diagram of FIG. 15 discloses the measurement process 161, which includes measurement setup procedure 162, measurement procedure 164, and measurement report procedure 166. Referring back to FIG. 13, the following relevant forms are provided: measurement form 136 and measurement report form 138.

The Serial Communication modules control serial communication with the electrometer, and include the SerialReceive and Serial modules. The SerialReceive module contains the routines to control the serial receive thread and all other serial communication routines are in the Serial module. The Serial Receive module consists of the routines to control a separate serial receive thread which runs continuously and monitors the serial port for received characters. The Serial module contains the routines to handle the bi-directional serial port which is the means for communicating with the electrometer. It contains both low level serial routines as well as a repository for some of the data buffered from the electrometer unit.

The Data sampling modules handle data sampling functions that take the received sample data and route them to the proper routine for processing. These modules include the SampleData, DemoControl, WaitForRad, and ElectrometerError modules. The SampledData module contains the routines to receive the samples from the electrometer (or the PC if in Demo Mode) and convert them into units of radiation. It performs drift and offset tests and also directs the sample data to the appropriate place based on the current mode. The DemoControl module contains the routines to start and stop simulated radiation while in Demo Mode. It also sends simulated radiation samples just as if they were received from the serial port to support system checkout. The WaitForRad module contains the software to present a dialog box when we are waiting for radiation or the drift test to conclude. The ElectrometerError module contains the software to present an error dialog box when the electrometer stops responding during a measurement.

The Reports modules provide the report formatting information and include the Report and ConfigReport modules. The Report module contains the software to generate and display the measurement report. The ConfigReport module contains the software to generate and display the configuration report. With respect to FIG. 13, relevant forms include the detector configuration reports form 130, configuration reports form 132 and the measurement report form 138.

The Test support module handles the Test functions in includes the maintenance module. These are functions that are used for program verification and post-mortem analysis. These functions are not visible to the user. The maintenance module consists of the routines to support maintenance and troubleshooting functions, such as reading the EEPROM, and viewing the ErrorLog, CommLog, and databases. With respect to FIG. 13, see the Test Form 140.

Referring to FIG. 14, the above-mentioned configuration database 150 of the dosimetry application software of the present invention is shown. A configuration procedure 152 of the above-mentioned DetectorConfig module is used to calculate conversion factors (as described hereinafter), which are stored in the configuration database 150. Thereafter, during subsequent measurement procedures (discussed hereinafter with respect to FIGS. 15 and 17), these conversion factors are accessed from the configuration database 150 and used for conversion of raw counts as measured by the analog-to-digital converter of the microcontroller (see FIG. 3) into radiation units.

In the configuration procedure 152, the detectors of the dosimeter (see FIG. 3) are exposed to a known amount of radiation at a set energy and distance. Under these defined conditions, a set of configuration factors are calculated. The configuration procedure 152 has the following initial steps: (1) Enter the required information: the name of the accelerator (not shown), the amount and type of energy, and the amount of delivered radiation. (2) Adjust the distance on the accelerator as directed by the on screen prompts. If the energy type is electrons then only a single set of exposures at a distance of 100 cm will be required. However, if the energy type is photons then a set of exposures at each of the distances 90, 100, and 110 cm are required. (3) Perform one or more exposure at each of the required distances. Allow the user to select which exposure or exposures that he wishes to use and show him how tight the grouping is in this set by displaying the average and standard deviation of the selected exposures. (4) When all exposures are complete let the user save the completed configuration and display a report 156 of the configuration results.

The configuration factors calculated by the configuration procedure 152 (involving Configuration modules) involve different calculations which depend upon each energy type. For electrons, the configuration factor is calculated by dividing the amount of delivered radiation by the average number of counts of all the selected exposures:

Configuration factor=(Delivered radiation)/(average counts of all selected exposures)

For photons, there are two sets of corrections. Which one is actually used is based on the measurement distance. Two lines are used to approximate a curve, so a slope and Y offset are calculated for each line. The first line is based on measurements at 90 and 100 cm, while the second line is based on measurements at 100 and 110 cm. A correction factor is calculated at each distance by dividing the amount of delivered radiation by the average number of counts for all the selected exposures:

Correction factor=(Delivered radiation)/(average counts of all selected exposures)

Then by using the data for each of the distances, two lines are constructed for each channel by using the general formula:

$$\text{Slope} = \frac{Y2-Y1}{X2-X1} = \frac{Corr2-Corr}{Distance2-Distance1}$$

Offset=$Y-mX$=$Corr2$-(Slope*Distance2)

Where: X=distance, Y=correction

Solving for our two lines:

Slope1=(Corr100−Corr90)/(100−90)

Offset1=Corr100−(Slope1*100)

Slope2=(Corr100−Corr110)/(100−110)

Offset2=Corr100−(Slope2*100)

Figure 16:
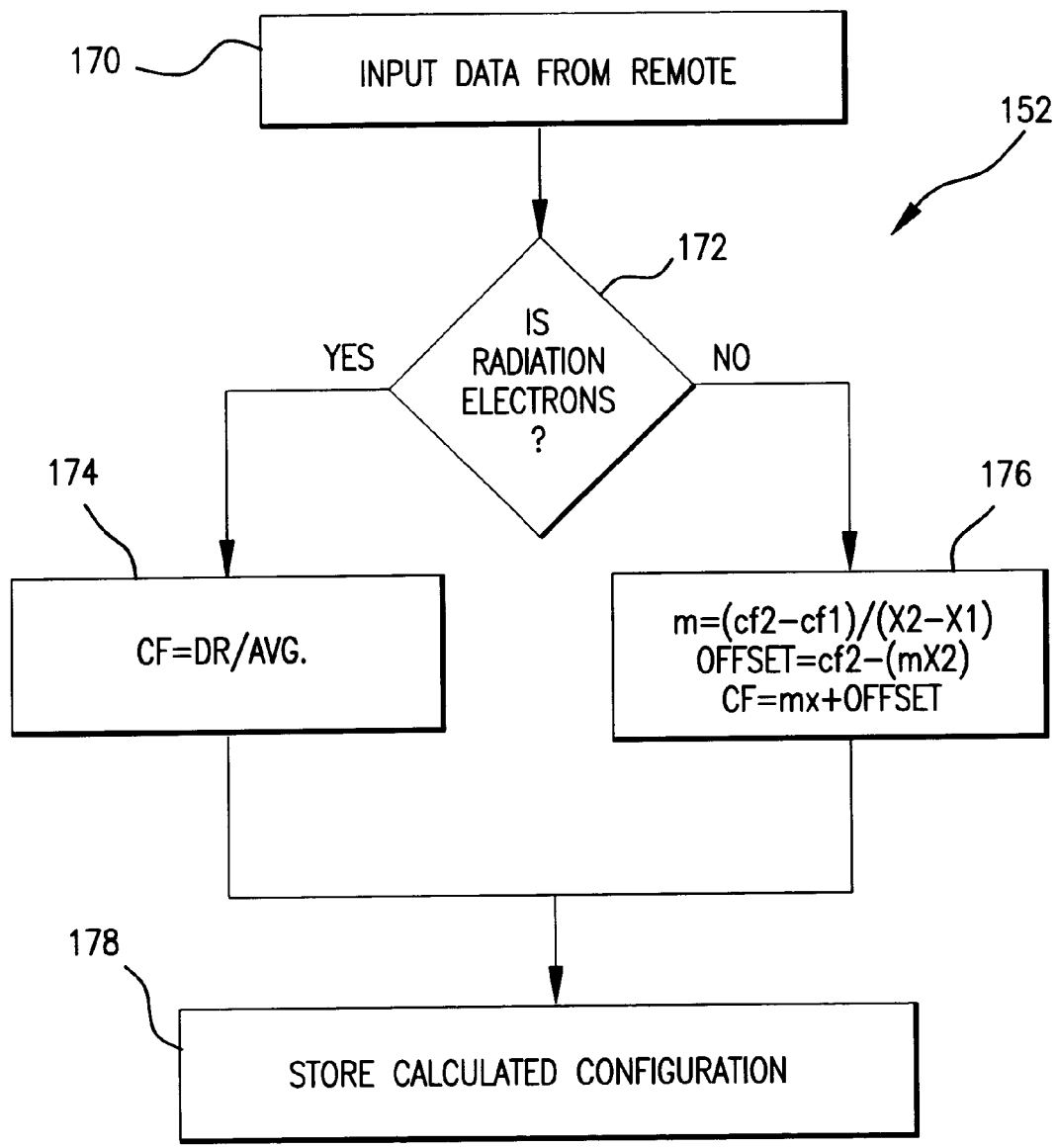
FIG. 16 is a flowchart depicting the overall configuration process of the dosimetry application software of the present invention.

FIG. 16 is a flowchart depicting the overall configuration process of the configuration procedure 152 previously described with respect to FIG. 14. The procedure 152 is described with respect to one of the detector diodes of the dosimeter, but it should be understood that this procedure 152 must be repeated for the remaining diode of the diode pair. Exactly how the process flows depends on whether the radiation measured comprises electrons or photons. If the radiation is electrons then only a single set of exposures at a distance from the accelerator of, for example, 100 cm will be required. However, if the radiation is photons then a set of exposures at a plurality of distances will be needed, for example 90 cm, 100 cm, and 110 cm. The configuration procedure 152 begins the step 170 of inputting the raw count data from the one of the detecting diodes of the dosimeter. At step 172, the procedure 152 determines if the radiation measured is electrons or photons based on user input. If the radiation is electrons, then the configuration procedure flows to step 174 where a configuration factor, CF, is computed by dividing the delivered radiation, DR, by the average number of counts for each exposure:

$$CF = DR/\text{Avg.} \tag{1}$$

If the radiation is photons, the process flows to step 176 where a more complex set of calculations is performed. First, for any pair of distances, a preliminary configuration factor is calculated for each distance, cf1 and cf2, as was done with the electron radiation. The difference between the two pre-configuration factors is divided by the difference in distance to obtain a slope, m:

$$m = (cf2-cf1)/(X2-X1) \tag{2}$$

which may now be used to compute an offset:

$$\text{Offset} = cf2 - (m \times 2) \tag{3}$$

The configuration factor, CF, for photons is then computed for any distance, x, by the formula:

$$CF = mx + \text{Offset} \tag{4}$$

In the preferred embodiment, the pair of distances used for the photonic configuration will be relatively close together and it is most preferred that more than one set of distances be used. For example, a configuration for photon radiation will preferably be performed using measurements at X1=90 cm and X2=100 cm and another at X1=100 cm and X2=110 cm, so as to arrive at two configuration factors, one for each range. This is preferred because the slope, m, itself is variant with distance. Finally, in step 178 the calculated configuration factors are stored in the configuration database 150 of FIG. 14.

Referring back to FIG. 14, an adjustment procedure 154 supplements the configuration factors CF stored in the database 150 with storing adjustment factors in the database 150. More specifically, the adjustment procedure 154 inputs into the database 150 a first adjustment factor "ca" representing a correction of the raw count data from the dosimeter, such adjustment factor being a small amount without forcing a re-configuration via configuration capability 152. The range of modification is limited to +/−10%. That is the allowable range for this field is 0.9 to 1.1. Each channel (each detector defines a channel) can be adjusted independently and this adjustment is password protected. The adjustment procedure 154 also allows the user to input into the configuration database 150 a second adjustment factor "cu" to correct the measurement results independently for both channels. This factor allows the user to correct the results for times when they add something that could distort the measurement, such as a wedge. A wedge is a metallic element that slides in and out of the radiation beam's field. By so doing the beam footprint is altered (sort of like covering, say, half of a port hole with a plate—instead of a circle there is now a half-moon opening). The range of correction is limited to −50% to +100%. That is the allowable range for this field is 0.5 to 2.0. It should be noted that these adjustment factors are merely stored in the configuration database 150 at this point and are not actually used until the measurement procedures described with respect to FIGS. 16 and 17 (described hereinafter).

Referring to FIG. 15, data (raw counts) from the two detector of the electrometer module is requested by the dosimetry application software at a 2 Hz rate. The electrometer transmits the data to the computer in raw counts, which are the actual readings from the A/D converter of the electrometer module. In the process shown in FIG. 15, the measured counts are then converted to radiation by the computer using the configuration factors CF, configuration adjustment "ca", and user correction "uc", all of which have been previously determined and stored in the configuration database 150. As mentioned above, there are two sets of configuration factors CF stored in the configuration database 150: one for electrons and one for photons. For electrons, there is a single multiplier for each channel. The raw counts for each channel are multiplied by the configuration factor for that channel to generate the radiation reading. In addition, the configuration adjustment and user correction for that channel are also multiplied with the raw counts and the configuration as well to allow further adjustment by the user:

Radiation=(Measured counts)(Configuration factor)
(Configuration adjustment)(User correction)

For Photons, there are two sets of corrections. Which one is used is based on the measurement distance. Two lines are used to approximate a curve, so a slope and Y offset are calculated for each line in the configuration process. The first line is based on measurements at 90 and 100 cm, while the second line is based on measurements at 100 and 110 cm. For each measurement the user is required to enter the distance. If the distance is less than or equal to 100 cm, then the slope and offset for line 1 is used, otherwise the line 2 correction is used. There is a slope and offset pair for each of the unit's two detectors. The slope of the appropriate line is multiplied by the measurement distance and the offset is added to this result. Then this value is used as the configuration factor. The raw counts for each detector are multiplied by the configuration factor to generate the radiation reading. In addition, the configuration adjustment and user correction are also multiplied with the raw counts and configuration as well to allow further adjustment by the user.

Figure 17:
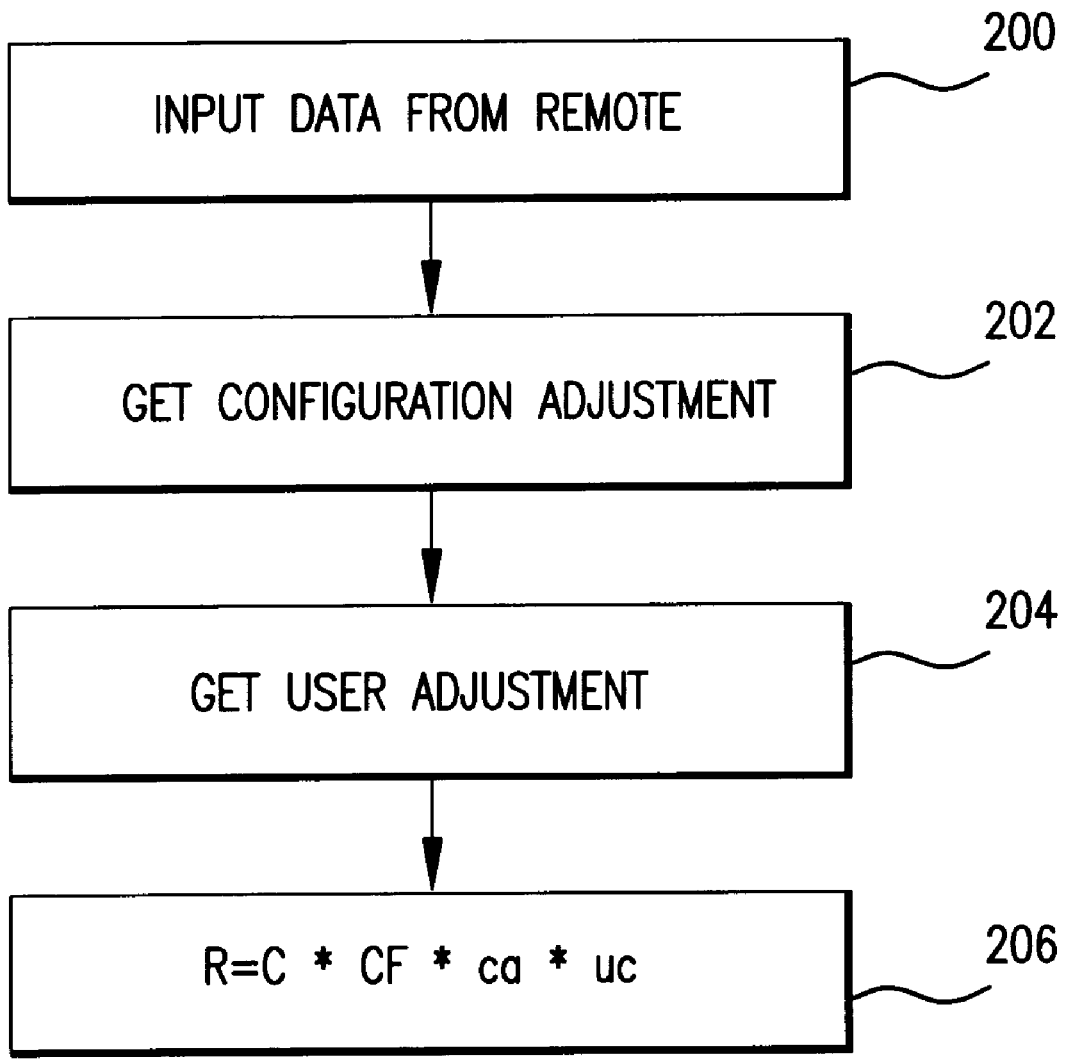
FIG. 17 is a flowchart depicting the overall measurement process of the dosimetry application software of the present invention.

For distances less than or equal to 100 cm:
Configuration factor=(Slope1*distance)+Offset1
For distances greater than 100 cm:
Configuration factor=(Slope2*distance)+Offset2
Radiation=Measured counts*Configuration factor*Configuration adjustment*User correction FIG. 17 is a flowchart depicting a portion of the measurement process 161 (generally discussed earlier with respect to FIG. 15) is shown. At step 200, raw count data is retrieved from the dosimeter. Typical rates of measurements will be from 1 to 5 Hz, generally about 2 Hz. As previously described, the configuration adjustment factor has been stored in the configuration database, which allows for modifying an existing configuration by a small amount without having to perform the configuration task all over again. Hence, control flows to step 202 where a configuration adjustment factor is retrieved from the configuration database. Preferably, this factor will be limited to no more than +/−10% of the configuration factor CF. In a preferred embodiment, control flows to step 204 where a user correction factor, uc, is retrieved from the configuration database. Preferably, the correction factor will be limited to +/−50% of the configuration factor, CF. Finally, for each diode, the radiation, R, is calculated by multiplying the number of raw counts, C, by the configuration factor, CF, the configuration adjustment, ca, and the user correction, uc.

$$R=C*CF*ca*uc \quad (5)$$

and the result is stored and/or displayed to the user.

FIG. 18 is a table showing a data file of a measurement report of one embodiment of the present invention. FIG. 18 shows a n export Measurement Report Data File. The measurement data that is presented in a report can also be exported to a CSV format file for manipulation by the user. The CSV format allows an easy import by a spreadsheet program such as Excel. The use will select the file name and directory where the file will be saved.

FIG. 19 is a table showing a data file of a measurement sample log of one embodiment of the present invention. FIG. 16 shows Sample Data Output of measured data. The data recorded during a measurement is saved for later verification and post-mortem analysis. These files are intended for factory use only. Two files are saved for each measurement: SampleLogXX.CSV and MeasureLogXX.CSV. The SampleLog contains the low level data such as the A/D readings for each sample and various intermediate values. The MeasureLog records the sample data after any needed conversions are performed but only records during the period that an exposure is occurring. Between these two files there is enough data stored to allow for a post-mortem analysis of a measurement. In addition the file ErrorLog.txt is saved for each program run. Any errors that are logged by the program are saved in this file. Optionally the file CommLog.txt may be saved which will contain a record of communication between the PC and the electrometer.

FIG. 20 is a table showing a data file of a measurement log of one embodiment of the present invention. FIG. 21 is a table showing a database file for a measurement of one embodiment of the present invention. Two sets of data are stored into database tables: the data which is recorded during a measurement and the configuration data recorded at the end of a successful configuration. This data is stored as Paradox database tables and they are accessed using the Borland Database Engine (BDE). FIG. 22 is a table showing a database file for a configuration of one embodiment of the present invention.

The processes of the invention may be executed as a program of instructions executable by machine. The instructions will generally be stored on a medium, readable by machine, such as RAM, ROM, diskette, or hard drive, as is known in the art.

While various values, scalar and others, may be disclosed herein, it is to be understood that these are not exact values, but rather to be interpreted as "about" such values. Further, the use of a modifier such as "about" or "approximately" in this specification with respect to any one value is not to imply that the absence of such a modifier with respect to another value indicates the latter to be exact.

Changes and modifications can be made by those skilled in the art to the embodiments as disclosed herein and such examples, illustrations, and theories are for explanatory purposes and are not intended to limit the scope of the claims.

The invention claimed is:

1. A dosimeter for verification the amount of radiation received by a patient undergoing radiation therapy, comprising:
   at least one dedicated, solid-state radiation detector for generating a plurality of electrical impulse signals in response to detecting said radiation;
   an electrometer module, in response to receiving said electrical impulse signals from said radiation detector, for converting said electrical impulse signals into a numerical count and outputting said count, said electrometer module including memory means for storing a plurality of configuration constants specific to said radiation detector, said configuration constants includes at least one of a serial number of said radiation detector, a factory calibration, and a date of first use; and
   an electrical wire, attached at one end to said radiation detector and attached at the other end to said electrometer module, for transmitting said electrical impulse signals from said radiation detector to said electrometer module.

2. The apparatus in accordance with claim 1, when said electrometer module further includes a signal integrator for integrating said electrical impulse signals to generate an integrated signal; and an analog-to-digital converter for digitizing said integrated signal to produce said count.

3. The apparatus in accordance with claim 2, wherein said at least one radiation detector is a diode.

4. The apparatus in accordance with claim 3, wherein said electrometer module has a data port for outputting said count.

5. The apparatus in accordance with claim 4, wherein there are two said radiation detectors.

6. The apparatus in accordance with claim 4, wherein the data port is a USB port, parallel port, serial port, phone jack, LAN connection, or RF transmitter.

7. The apparatus in accordance with claim 4, further comprising a computer operably connected to the data port and configured to receive a plurality of said counts from said electrometer module for converting said counts into a measurement of said amount of radiation.

8. The apparatus in accordance with claim 7, further comprising an isolator box interposed between the computer and the electrometer module.

9. The apparatus in accordance with claim 1, wherein the at least one dedicated, solid-state radiation detectors consists of a pair of independently positionable radiation detectors.

10. A dosimetry system for verification the amount of radiation received by a patient undergoing radiation therapy, comprising:
    at least one dedicated, solid-state radiation detector for generating a plurality of electrical impulse signals in response to detecting said radiation;
    an electrometer module, in response to receiving said electrical impulse signals from said radiation detector, for converting said electrical impulse signals into a numerical count and outputting said count, said electrometer module including memory means for storing a plurality of configuration constants specific to said radiation detector, said configuration constants includes at least one of a serial number of said radiation detector, a factory calibration and a date of first use;
    an electrical wire, attached at one end to said radiation detector and attached at the other end to said electrometer module, for transmitting said electrical impulse signals from said radiation detector to said electrometer module; and a computer, in response to receiving a plurality of said counts from said electrometer module, for converting said counts into a measurement of said amount of radiation, said computer includes means for accessing said electrometer module to obtain said configuration constants.

11. The dosimetry system in accordance with claim 10, wherein said computer includes a software configuration routine for correlating said plurality of said counts to a predetermined amount of said radiation.

12. The dosimetry system in accordance with claim 11, wherein said software configuration routine includes calculating means for multiply said count by a configuration factor.

13. The dosimetry system in accordance with claim 12, wherein said configuration factor is equal to a known amount of delivered radiation divided by said counts generated by said delivered radiation.

14. The dosimetry system in accordance with claim 12, wherein said configuration factor is equal to a known amount of delivered radiation divided by an average number of counts generated by selected exposures to said delivered radiation.

15. The dosimetry system in accordance with claim 12, wherein said calculating means is adapted for multiplying said count by a configuration adjustment.

16. The dosimetry system in accordance with claim 12, wherein said calculating means is adapted for multiplying said count by a user correction.

17. The dosimetry system in accordance with claim 11, wherein said software configuration routine includes calculating means for calculating said amount of radiation by multiplying said counts by a configuration factor, a configuration adjustment and a user correction.

18. The apparatus in accordance with claim 10, wherein the at least one dedicated, solid-state radiation detectors consists of a pair of independently positionable radiation detectors.

19. The apparatus in accordance with claim 10, wherein the computer is independent of the electrometer module.

* * * * *